United States Patent
Zheng et al.

(10) Patent No.: US 8,972,177 B2
(45) Date of Patent: Mar. 3, 2015

(54) SYSTEM FOR LOGGING LIFE EXPERIENCES USING GEOGRAPHIC CUES

(75) Inventors: Yu Zheng, Beijing (CN); Longhao Wang, Beijing (CN); Xing Xie, Beijing (CN); Ruochi Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1187 days.

(21) Appl. No.: 12/037,347

(22) Filed: Feb. 26, 2008

(65) Prior Publication Data

US 2009/0216435 A1  Aug. 27, 2009

(51) Int. Cl.
*G01C 21/32* (2006.01)
*G09B 29/00* (2006.01)
*G06F 17/30* (2006.01)
*G06Q 10/10* (2012.01)
(Continued)

(52) U.S. Cl.
CPC .......... *G09B 29/007* (2013.01); *G06F 17/3087* (2013.01); *G06Q 10/10* (2013.01); *G06T 19/003* (2013.01); *G11B 27/105* (2013.01); *G11B 27/322* (2013.01); *H04N 21/4126* (2013.01); *H04N 21/4345* (2013.01); *H04N 21/4524* (2013.01); *G08G 1/096838* (2013.01); *H04N 2201/3253* (2013.01); *Y10S 707/92* (2013.01)
USPC ...... 701/454; 340/995.27; 701/424; 707/741; 707/920

(58) Field of Classification Search
USPC ................. 701/202, 209, 424, 429, 436, 454; 707/999.003, 999.004, 999.1, 741, 707/920, E17.018
See application file for complete search history.

(56) References Cited

U.S. PATENT DOCUMENTS 5,802,492 A   9/1998  DeLorme et al.
5,845,227 A   12/1998 Peterson
(Continued)

FOREIGN PATENT DOCUMENTS

JP   2002140362     5/2002
JP   2002304408 A  10/2002
(Continued)

OTHER PUBLICATIONS

Eagle et al; Community Computing: Comparisons between Rural and Urban Societies using Mobile Phone Data; 2009 International Conference on Computational Science and Engineering; pp. 144-150.*

(Continued)

*Primary Examiner* — Stephen Holwerda
(74) *Attorney, Agent, or Firm* — Sandy Swain; Judy Yee; Micky Minhas

(57) ABSTRACT

A system logs life experiences using geographic cues. The system variously provides a comprehensive life-logging tool for recording a plurality of different types of life events. In one implementation, the system receives a user's GPS log files and multimedia content at a website. The system segments the GPS log files into geographic routes corresponding to user trips, and tags the multimedia content with geographic cues from the GPS log files. Then, the system indexes the geographic routes so that users can retrieve the geographic routes by browsing or by search techniques. The system displays animations of selected routes on a map, and displays the multimedia content at corresponding locations along the map route, as the route is replayed. The system also provides browsing and spatial and temporal techniques to search a person's travels and can provide graphical displays of the person's activity statistics.

19 Claims, 9 Drawing Sheets

(51) Int. Cl.

| | | |
|---|---|---|
| G06T 19/00 | (2011.01) | |
| G11B 27/10 | (2006.01) | |
| G11B 27/32 | (2006.01) | |
| H04N 21/41 | (2011.01) | |
| H04N 21/434 | (2011.01) | |
| H04N 21/45 | (2011.01) | |
| G08G 1/0968 | (2006.01) | |

(56) References Cited

U.S. PATENT DOCUMENTS

| | | | |
|---|---|---|---|
| 5,904,727 A * | 5/1999 | Prabhakaran | 701/454 |
| 6,023,241 A * | 2/2000 | Clapper | 342/357.32 |
| 6,091,359 A | 7/2000 | Geier | |
| 6,091,956 A | 7/2000 | Hollenberg | |
| 6,122,628 A | 9/2000 | Castelli et al. | |
| 6,128,279 A | 10/2000 | O'Neil et al. | |
| 6,219,662 B1 | 4/2001 | Fuh et al. | |
| 6,243,647 B1 * | 6/2001 | Berstis et al. | 701/482 |
| 6,317,684 B1 | 11/2001 | Roeseler et al. | |
| 6,317,686 B1 | 11/2001 | Ran | |
| 6,351,775 B1 | 2/2002 | Yu | |
| 6,356,838 B1 | 3/2002 | Paul | |
| 6,385,539 B1 | 5/2002 | Wilson et al. | |
| 6,411,897 B1 | 6/2002 | Gaspard, II | |
| 6,424,370 B1 | 7/2002 | Courtney | |
| 6,427,122 B1 | 7/2002 | Lin | |
| 6,430,547 B1 | 8/2002 | Busche et al. | |
| 6,446,121 B1 | 9/2002 | Shah et al. | |
| 6,493,650 B1 | 12/2002 | Rodgers et al. | |
| 6,496,814 B1 | 12/2002 | Busche | |
| 6,513,026 B1 | 1/2003 | Horvitz et al. | |
| 6,516,272 B2 | 2/2003 | Lin | |
| 6,553,310 B1 | 4/2003 | Lopke | |
| 6,584,401 B2 | 6/2003 | Kirshenbaum et al. | |
| 6,606,643 B1 | 8/2003 | Emens et al. | |
| 6,611,881 B1 | 8/2003 | Gottfurcht et al. | |
| 6,618,507 B1 | 9/2003 | Divakaran et al. | |
| 6,625,319 B1 | 9/2003 | Krishnamachari | |
| 6,724,733 B1 | 4/2004 | Schuba et al. | |
| 6,732,120 B1 | 5/2004 | Du | |
| 6,785,704 B1 | 8/2004 | McCanne | |
| 6,816,779 B2 | 11/2004 | Chen et al. | |
| 6,904,160 B2 | 6/2005 | Burgess | |
| 6,919,842 B2 | 7/2005 | Cho | |
| 6,925,447 B2 | 8/2005 | McMenimen et al. | |
| 6,965,827 B1 | 11/2005 | Wolfson | |
| 6,970,884 B2 | 11/2005 | Aggarwal | |
| 6,981,055 B1 | 12/2005 | Ahuja et al. | |
| 7,003,555 B1 | 2/2006 | Jungck | |
| 7,013,290 B2 | 3/2006 | Ananian | |
| 7,013,517 B2 | 3/2006 | Kropf | |
| 7,031,517 B1 | 4/2006 | Le et al. | |
| 7,062,562 B1 | 6/2006 | Baker et al. | |
| 7,111,061 B2 | 9/2006 | Leighton et al. | |
| 7,136,932 B1 | 11/2006 | Schneider | |
| 7,152,118 B2 | 12/2006 | Anderson, IV et al. | |
| 7,155,456 B2 | 12/2006 | Abbott, III et al. | |
| 7,171,415 B2 | 1/2007 | Kan et al. | |
| 7,194,552 B1 | 3/2007 | Schneider | |
| 7,197,500 B1 | 3/2007 | Israni et al. | |
| 7,203,693 B2 | 4/2007 | Carlbom et al. | |
| 7,219,067 B1 | 5/2007 | McMullen et al. | |
| 7,228,359 B1 | 6/2007 | Monteiro | |
| 7,233,861 B1 | 6/2007 | Van Buer et al. | |
| 7,239,962 B2 | 7/2007 | Plutowski | |
| 7,281,199 B1 | 10/2007 | Nicol et al. | |
| 7,284,051 B1 | 10/2007 | Okano et al. | |
| 7,349,768 B2 | 3/2008 | Bruce et al. | |
| 7,366,726 B2 | 4/2008 | Bellamy et al. | |
| 7,389,283 B2 | 6/2008 | Adler | |
| 7,395,250 B1 | 7/2008 | Aggarwal et al. | |
| 7,428,551 B2 | 9/2008 | Luo et al. | |
| 7,437,239 B2 | 10/2008 | Serre | |
| 7,437,372 B2 | 10/2008 | Chen et al. | |
| 7,447,588 B1 | 11/2008 | Xu et al. | |
| 7,479,897 B2 | 1/2009 | Gertsch et al. | |
| 7,493,294 B2 | 2/2009 | Flinn et al. | |
| 7,519,690 B1 | 4/2009 | Barrow et al. | |
| 7,548,936 B2 | 6/2009 | Liu et al. | |
| 7,561,959 B2 | 7/2009 | Hopkins et al. | |
| 7,574,508 B1 | 8/2009 | Kommula | |
| 7,584,159 B1 | 9/2009 | Chakrabarti et al. | |
| 7,584,301 B1 | 9/2009 | Joshi | |
| 7,603,233 B2 | 10/2009 | Tashiro | |
| 7,610,151 B2 | 10/2009 | Letchner et al. | |
| 7,660,441 B2 | 2/2010 | Chen et al. | |
| 7,685,422 B2 | 3/2010 | Isozaki et al. | |
| 7,706,964 B2 | 4/2010 | Horvitz et al. | |
| 7,707,314 B2 | 4/2010 | McCarthy et al. | |
| 7,710,984 B2 | 5/2010 | Dunk | |
| 7,739,040 B2 | 6/2010 | Horvitz | |
| 7,801,842 B2 | 9/2010 | Dalton | |
| 7,860,891 B2 | 12/2010 | Adler et al. | |
| 7,904,530 B2 | 3/2011 | Partridge et al. | |
| 7,930,427 B2 | 4/2011 | Josefsberg et al. | |
| 7,948,400 B2 | 5/2011 | Horvitz et al. | |
| 7,982,635 B2 * | 7/2011 | Seong | 340/995.1 |
| 7,984,006 B2 | 7/2011 | Price | |
| 7,991,879 B2 | 8/2011 | Josefsberg et al. | |
| 8,060,462 B2 | 11/2011 | Flinn et al. | |
| 8,117,138 B2 | 2/2012 | Apte et al. | |
| 8,135,505 B2 | 3/2012 | Vengroff et al. | |
| 8,190,649 B2 | 5/2012 | Bailly | |
| 8,219,112 B1 | 7/2012 | Youssef et al. | |
| 8,275,649 B2 | 9/2012 | Zheng et al. | |
| 8,458,298 B2 | 6/2013 | Josefsberg et al. | |
| 8,562,439 B2 | 10/2013 | Shuman et al. | |
| 8,577,380 B2 | 11/2013 | Martinez et al. | |
| 2002/0032689 A1* | 3/2002 | Abbott et al. | 707/104.1 |
| 2002/0038360 A1 | 3/2002 | Andrews et al. | |
| 2002/0044690 A1 | 4/2002 | Burgess | |
| 2002/0052873 A1 | 5/2002 | Delgado et al. | |
| 2002/0062193 A1 | 5/2002 | Lin | |
| 2002/0077749 A1* | 6/2002 | Doi | 701/209 |
| 2002/0128768 A1 | 9/2002 | Nakano et al. | |
| 2003/0053424 A1 | 3/2003 | Krishnamurthy et al. | |
| 2003/0063133 A1* | 4/2003 | Foote et al. | 345/850 |
| 2003/0069893 A1* | 4/2003 | Kanai et al. | 707/104.1 |
| 2003/0069968 A1 | 4/2003 | O'Neil et al. | |
| 2003/0139898 A1 | 7/2003 | Miller et al. | |
| 2003/0140040 A1 | 7/2003 | Schiller | |
| 2003/0195810 A1 | 10/2003 | Raghupathy et al. | |
| 2003/0212689 A1 | 11/2003 | Chen et al. | |
| 2003/0217070 A1 | 11/2003 | Gotoh et al. | |
| 2003/0229697 A1 | 12/2003 | Borella | |
| 2004/0039798 A1 | 2/2004 | Hotz et al. | |
| 2004/0064338 A1* | 4/2004 | Shiota et al. | 705/1 |
| 2004/0073640 A1 | 4/2004 | Martin et al. | |
| 2004/0117358 A1 | 6/2004 | von Kaenel et al. | |
| 2004/0196161 A1 | 10/2004 | Bell et al. | |
| 2004/0198386 A1 | 10/2004 | Dupray | |
| 2004/0217884 A1* | 11/2004 | Samadani et al. | 340/995.14 |
| 2004/0220965 A1 | 11/2004 | Harville et al. | |
| 2004/0264465 A1 | 12/2004 | Dunk | |
| 2005/0004830 A1 | 1/2005 | Rozell et al. | |
| 2005/0004903 A1 | 1/2005 | Tsuda | |
| 2005/0031296 A1 | 2/2005 | Grosvenor | |
| 2005/0075116 A1* | 4/2005 | Laird et al. | 455/456.3 |
| 2005/0075119 A1 | 4/2005 | Sheha et al. | |
| 2005/0075782 A1 | 4/2005 | Torgunrud | |
| 2005/0080554 A1 | 4/2005 | Ono et al. | |
| 2005/0108261 A1* | 5/2005 | Glassy et al. | 707/100 |
| 2005/0131889 A1 | 6/2005 | Bennett et al. | |
| 2005/0198286 A1 | 9/2005 | Xu et al. | |
| 2005/0203927 A1 | 9/2005 | Sull et al. | |
| 2005/0225678 A1 | 10/2005 | Zisserman et al. | |
| 2005/0231394 A1 | 10/2005 | Machii et al. | |
| 2005/0265317 A1 | 12/2005 | Reeves et al. | |
| 2005/0278371 A1* | 12/2005 | Funk et al. | 707/102 |
| 2006/0020597 A1 | 1/2006 | Keating et al. | |
| 2006/0036630 A1 | 2/2006 | Gray | |
| 2006/0042483 A1 | 3/2006 | Work et al. | |
| 2006/0075139 A1 | 4/2006 | Jungck | |

(56) References Cited

U.S. PATENT DOCUMENTS

| | | |
|---|---|---|
| 2006/0085177 A1 | 4/2006 | Toyama et al. |
| 2006/0085419 A1 | 4/2006 | Rosen |
| 2006/0090122 A1 | 4/2006 | Pyhalammi et al. |
| 2006/0095540 A1 | 5/2006 | Anderson et al. |
| 2006/0101377 A1 | 5/2006 | Toyama et al. |
| 2006/0129675 A1 | 6/2006 | Zimmer et al. |
| 2006/0143442 A1 | 6/2006 | Smith |
| 2006/0155464 A1 | 7/2006 | Smartt |
| 2006/0156209 A1 | 7/2006 | Matsuura et al. |
| 2006/0161560 A1 | 7/2006 | Khandelwal et al. |
| 2006/0173838 A1 | 8/2006 | Garg et al. |
| 2006/0178807 A1 | 8/2006 | Kato et al. |
| 2006/0190602 A1 | 8/2006 | Canali et al. |
| 2006/0200539 A1 | 9/2006 | Kappler et al. |
| 2006/0212217 A1 | 9/2006 | Sheha et al. |
| 2006/0224303 A1 | 10/2006 | Hayashi |
| 2006/0224773 A1 | 10/2006 | Degenaro et al. |
| 2006/0247844 A1 | 11/2006 | Wang et al. |
| 2006/0251292 A1 | 11/2006 | Gokturk et al. |
| 2006/0266830 A1 | 11/2006 | Horozov et al. |
| 2007/0005419 A1 | 1/2007 | Horvitz et al. |
| 2007/0006098 A1 | 1/2007 | Krumm et al. |
| 2007/0016663 A1 | 1/2007 | Weis |
| 2007/0038362 A1 | 2/2007 | Gueziec |
| 2007/0041393 A1 | 2/2007 | Westhead et al. |
| 2007/0064633 A1 | 3/2007 | Fricke |
| 2007/0064715 A1 | 3/2007 | Lloyd et al. |
| 2007/0088974 A1 | 4/2007 | Chandwani et al. |
| 2007/0100776 A1 | 5/2007 | Shah et al. |
| 2007/0118668 A1 | 5/2007 | McCarthy et al. |
| 2007/0127833 A1 | 6/2007 | Singh |
| 2007/0168208 A1 | 7/2007 | Aikas et al. |
| 2007/0203638 A1 | 8/2007 | Tooyama et al. |
| 2007/0226004 A1 | 9/2007 | Harrison |
| 2008/0004789 A1 | 1/2008 | Horvitz et al. |
| 2008/0004793 A1 | 1/2008 | Horvitz et al. |
| 2008/0016051 A1 | 1/2008 | Schiller |
| 2008/0016233 A1 | 1/2008 | Schneider |
| 2008/0052303 A1 | 2/2008 | Adler et al. |
| 2008/0059576 A1 | 3/2008 | Liu et al. |
| 2008/0071465 A1 | 3/2008 | Chapman et al. |
| 2008/0076451 A1 | 3/2008 | Sheha et al. |
| 2008/0086574 A1 | 4/2008 | Raciborski et al. |
| 2008/0098313 A1 | 4/2008 | Pollack |
| 2008/0201074 A1 | 8/2008 | Bleckman et al. |
| 2008/0201102 A1 | 8/2008 | Boettcher et al. |
| 2008/0214157 A1 | 9/2008 | Ramer et al. |
| 2008/0215237 A1 | 9/2008 | Perry |
| 2008/0228396 A1 | 9/2008 | Machii et al. |
| 2008/0228783 A1 | 9/2008 | Moffat |
| 2008/0235383 A1 | 9/2008 | Schneider |
| 2008/0268876 A1 | 10/2008 | Gelfand et al. |
| 2008/0270019 A1 | 10/2008 | Anderson et al. |
| 2008/0312822 A1 | 12/2008 | Lucas et al. |
| 2008/0319660 A1 | 12/2008 | Horvitz et al. |
| 2008/0319974 A1 | 12/2008 | Ma et al. |
| 2009/0019181 A1 | 1/2009 | Fang et al. |
| 2009/0063646 A1 | 3/2009 | Mitnick |
| 2009/0083128 A1 | 3/2009 | Siegel |
| 2009/0083237 A1 | 3/2009 | Gelfand et al. |
| 2009/0100018 A1 | 4/2009 | Roberts |
| 2009/0138188 A1 | 5/2009 | Kores et al. |
| 2009/0164516 A1 | 6/2009 | Svendsen et al. |
| 2009/0213844 A1 | 8/2009 | Hughston |
| 2009/0216435 A1 | 8/2009 | Zheng et al. |
| 2009/0216704 A1 | 8/2009 | Zheng et al. |
| 2009/0222581 A1 | 9/2009 | Josefsberg et al. |
| 2009/0228198 A1 | 9/2009 | Goldberg et al. |
| 2009/0239552 A1 | 9/2009 | Churchill et al. |
| 2009/0282122 A1 | 11/2009 | Patel et al. |
| 2009/0326802 A1 | 12/2009 | Johnson |
| 2010/0004997 A1 | 1/2010 | Mehta et al. |
| 2010/0010991 A1 | 1/2010 | Joshi |
| 2010/0027527 A1 | 2/2010 | Higgins et al. |
| 2010/0070171 A1 | 3/2010 | Barbeau et al. |
| 2010/0076968 A1 | 3/2010 | Boyns et al. |
| 2010/0082611 A1 | 4/2010 | Athsani et al. |
| 2010/0111372 A1 | 5/2010 | Zheng et al. |
| 2010/0153292 A1 | 6/2010 | Zheng et al. |
| 2010/0279616 A1 | 11/2010 | Jin et al. |
| 2010/0312461 A1 | 12/2010 | Haynie et al. |
| 2011/0022299 A1 | 1/2011 | Feng et al. |
| 2011/0029224 A1 | 2/2011 | Chapman et al. |
| 2011/0130947 A1 | 6/2011 | Basir |
| 2011/0173015 A1 | 7/2011 | Chapman et al. |
| 2011/0184949 A1 | 7/2011 | Luo |
| 2011/0191011 A1 | 8/2011 | McBride et al. |
| 2011/0191284 A1 | 8/2011 | Dalton |
| 2011/0208419 A1 | 8/2011 | Boss et al. |
| 2011/0280453 A1 | 11/2011 | Chen et al. |
| 2011/0282798 A1 | 11/2011 | Zheng et al. |
| 2011/0302209 A1 | 12/2011 | Flinn et al. |
| 2012/0030029 A1 | 2/2012 | Flinn et al. |
| 2012/0030064 A1 | 2/2012 | Flinn et al. |
| 2012/0150425 A1 | 6/2012 | Chapman et al. |

FOREIGN PATENT DOCUMENTS

| | | |
|---|---|---|
| JP | 2003044503 A | 2/2003 |
| KR | 20050072555 A | 7/2005 |
| KR | 20060006271 A | 1/2006 |
| KR | 100650389 B1 | 11/2006 |
| WO | WO2006097907 A2 | 9/2006 |
| WO | WO2007087615 A | 8/2007 |
| WO | WO2007145625 A | 12/2007 |
| WO | WO2009053411 | 4/2009 |
| WO | WO2009053411 A1 | 4/2009 |
| WO | WO2010062726(A2) | 6/2010 |

OTHER PUBLICATIONS

"Learning and inferring transportation routines"; Liao et al.; Artificial Intelligence, vol. 171, pp. 311-331; 2007.*

Liao et al.; "Learning and inferring transportation routines"; Liao et al.; Artificial Intelligence, vol. 171, pp. 311-331; 2007.*

Aizawa, et al., "Capture and Efficient Retrieval of Life Log", available at least as early as Nov. 16, 2007, at <<http://www.ii.ist.i.kyoto-u.ac.jp/-sumi/pervasive04/program/Aizawa.pdf>>, pp. 6.

Aizawa, "Digitizing Personal Experiences: Capture and Retrieval of Life Log", at <<http://ieeexplore.ieee.org/iel5/9520/30168/01385968,pdf?arnumber=1385968 >>, IEEE, 2007, pp. 1.

Allen, "Dredging-up the Past: Lifelogging, Memory and Surveillance", at <<http://lsr.nellco.org/cgi/viewcontent.cgi? article=1177 &context=upenn/wps>>, University of Pennsylvania Law School, 2007, pp. 50.

Sellen, et al., "Do Life-Logging Technologies Support Memory for the Past? An Experimental Study Using SenseCam", available at least as early as Nov. 16, 2007, at <<http://research.microsoft.com/sds/papers/SensecamMemCHICamRdy.pdf>>, pp. 10.

Winogard, "Dynamic Cartograms for Navigating Geo-referenced Photographs", available at least as early as Nov. 16, 2007, at <<http://cs.stanford.edu/research/project.php?id=289>>, pp. 2.

Adomavicius, Tuzhilin, "Toward the Next Generation of Recommender Systems: A Survey of the State-of-the-Art and Possible Extensions", retrieved on Dec. 29, 2009 at <<http://www.inf.unibz.it/~ricci/ATIS/papers/state-of-the-art-2005.pdf>>, IEEE Transactions on Knowledge and Data Engineering, vol. 17, No. 6, Jun. 2005, pp. 734-749.

Agrawal, et al., "Mining Sequential Patterns", retrieved on Aug. 4, 2009 at <<http://www.almaden.ibm.com/cs/projects/iis/ hdb/Publications/papers/icde95.ps.gz>>, Proceedings of ICDE 1995, Mar. 1995, 12 pgs.

Ankerst et al., "OPTICS: Ordering Points to Identify the Clustering Structure", Proceedings of the ACM SIGMOD 1999 International Conference on Management of Data, Philadelphia, Pennsylvania, retrieved Apr. 30, 2010 at <<http://www.dbs.informatik.uni-muenchen.de/Publicationen/Papers/OPTICS.pdf>>, Jun. 1-3, 1999, 12 pages.

Brakatsoulas, et al., "On Map-Matching Vehicle Tracking Data", VLDB Endowment, In the Proceedings of the 31st International on Conference on Very Large Data Bases, Sep. 2005, pp. 853-864.

(56) References Cited

OTHER PUBLICATIONS

Chan, et al, "Efficient Time Series Matching by Wavelets", retrieved on Apr. 15, 2010 at <<http://infolab.usc.edu/csci599/Fa112003/Time%20Series/Efficient%20Time%20Series%20Matching%20by%20Wavelets.pdf>>, IEEE Computer Society, Proceedings of Conference on Data Engineering (ICDE), Mar. 1999, pp. 126-133.

Chen, et al, "On The Marriage of Lp-norms and Edit Distance", retrieved on Apr. 15, 2010 at <<http://www.google.co.in/url?sa=t&source=web&ct=res&cd=3&ved=0CBEQFjAC&url=http%3A%2F%2Fciteseerx.ist.psu.edu%2Fviewdoc%2Fdownload%3Fdoi%3D10.1.1.1.7443%26rep%3Drep1%26type%3Dpdf&rct=j&q=On+the+marriage+of+lp-norms+and+edit+distance&ei=_ezGS62IE439__Aa1qlzZDA&usg=AFQjCNHFZScVkE4uy1b_oC-Pr4ur7KIBdQ>>, Proceedings of Conference on Very Large Data Bases (VLDB), Aug. 29-Sep. 3, 2004, pp. 792-803.

Chen, et al, "Robust and Fast Similarity Search for Moving Object Trajectories", retrieved on Apr. 15, 2010 at <<http://citeseerx.ist.psu.edu/viewdoc/download;jsessionid=2C0EAC347F5F144727996F29CEFD49FB?doi=10.1.1.94.8191&rep=rep1&type=pdf>>, ACM, Conference on Management of Data, Jun. 2005, pp. 491-502.

Ding et al, "Querying and Mining of Time Series Data: Experimental Comparison of Representations and Distance Measures", retrieved on Apr. 15, 2010 at http://www.vldb.org/pvldb/1/1454226.pdf>>, VLDB Endowment, PVLDB'08, Aug. 23-28, 2008, pp. 1542-1552.

Eagle et al, "Reality mining: sensing complex social systems", Springer-Verlag London, Personal and Ubiquitous Computing, vol. 10, Issue 4, Mar. 2006, pp. 255-268.

Faloutsos et al, "Fast Subsequence Matching in Time-Series Databases," Proceedings of the 1994 ACM SIGMOD International Conference on Management of Data , vol. 23, No. 2, Jun. 1994, 11 pgs.

Frentzos et al, "Index-based Most Similar Trajectory Search", retrieved on Apr. 15, 2010 at <<http://isl.cs.unipi.gr/pubs/TR//UNIPI-ISL-TR-2006-01.pdf>>, IEEE Conference on Data Engineering (Technical Report UNIPI-ISL-TR-2006-01), Jun. 2006, pp. 1-12.

Giannotti, et al., "Trajectory Pattern Mining", retrieved on Aug. 4, 2009 at <<http://cs.gmu.edu/~jessica/temp/p330-giannotti.pdf, ACM, KDD'07, Aug. 2007, pp. 330-339.

Gustavsen, "Condor—an application framework for mobility-based context-aware applications", retrieved on Aug. 4, 2009 at <<http://www.comp.lancs.ac.uk/~dixa/conf/ubicomp2002-models/pdf/Gustavsen-goteborg%20sept-02.pdf>>, UBICOMP 2002, 2002, pp. 1-6.

Lee, et al., "Trajectour Clustering: A Partition-and-Group Framework", retrieved on Aug. 4, 2009 at <<http://www.cs.uiuc.edu/homes/hanj/pdf/sigmod07_lglee.pdf>>, ACM, SIGMOD 2007, 2007, pp. 1-12.

Mamoulis, Cao, Kollios, Hadjieleftheriou, Tao, Cheung, "Mining, Indexing, and Querying Historical Spatiotemporal Data", retrieved on Dec. 29, 2009 at http://i.cs.hku.hk/~nikos/sigkdd2004_1.pdf>>, ACM Proceedings of Conference on Knowledge Discovery and Data Mining (KDD), Aug. 22, 2004, pp. 236-245.

Miyaki, et al., "Tracking Persons Using Particle Filter Fusing Visual and Wi-Fi Localizations for Widely Distributed Camera", retrieved on Aug. 4, 2009 at <<http://ieeexplore.ieee.org/stamp/stamp.jsp?arnumber=04379287>>, IEEE Intl Conference on Image Processing. ICIP 2007, vol. 3, 2007, pp. 225-228.

Monreale, et al., "WhereNext: a Location Predictor on Trajectory Pattern Mining", retrieved Aug. 4, 2009 at <<http:// delivery.acm.org/10.1145/1560000/1557091/p637-monreale.pdf?key1=1557091&key2=5182739421&coll=GUIDE&dl=Guide&CFID=47499709&CFTOKEN=90308932>>, ACM, KDD 2009, 2009, pp. 637-645.

Morimoto, "Mining Frequent Neighboring Class Sets in Spatial Databases", retrieved on Dec. 29, 2009 at <<http://delivery.acm.org/10.1145/510000/502564/p353-morimoto.pdf?key1=502564&key2=1634712621&coll=GUIDE&dl=GUIDE&CFID=70432903&CFTOKEN=93744375>>, ACM Proceedings of Conference on Knowledge Discovery and Data Mining (KDD), 2001, pp. 353-358.

Saltenis, "Outlier Detection Based on the Distribution of Distances between Data Points", retrieved on Dec. 12, 2008 at <<http://www.mii.lt/informatica/pdf/INFO558.pdf>>, INFORMATICA, vol. 15, No. 3, 2004, pp. 399-410.

Salton, et al., "A Vector Space Model for Automatic Indexing", Communications of the ACM, vol. 187, No. 11, Nov. 1975, pp. 613-620.

Salton, "Dynamic Document Processing", Communicatins of the ACM, vol. 15, Issue 7, Jul. 1972, pp. 658-668.

Takeuchi et al., "An Outdoor Recommendation System Based on User Location History", Proceedings of the 1st International Workshop on Personalized Context Modeling and Management for UbiComp Applications (ubiPCMM 2005), Tokyo, Japan Sep. 11, 2005, pp. 91-100, retrieved Apr. 16, 2010.

Taylor, et al., "Virtual Differential GPS & Road Reduction Filtering by Map Matching", In the Proceedings of IPN'99 Tweifth International Technical Meetings of the Satellite Division of the Institute of Navigation, 1999, pp. 1675-1684.

Viachos, Kollios, Gunopulos, "Discovering Similar Multidimensional Trajectories", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fviewdoc%2Fdownload%3Fdoi%3D10.1.1.106.1984%26rep%3Drep1%26type%3Dpdf&rct=j&q=Discovering+similar+multidimensional+trajectories&ei=ivfGS6HCM4uj__ga3wOiBDQ&usg=AFQjNG20j6K3s_WuY-VhWeDjlPYpgxv1Q>>, IEEE Computer Society, Proceedings of Conference on Data Engineering (ICDE), 2002, pp. 673-684.

Yi, Jagadish, Faloutsos, "Efficient Retrieval of Similar Time Sequences under Time Warping", retrieved on Apr. 15, 2010, pp. 1-15 of presentation slides, 1997.

Borzsonyi, et al., The Skyline Operator, In Proc. ICDE 2001, IEEE Press: 421-430, <<http://ieeexplore.ieee.org/stamp/stamp.jsp?tp=&arnumber=914855>>.

Brauckhoff, et al., Applying PCA for Traffic Anomaly Detection: Problems and Solutions, IEEE, 2009, 5 pages.

Cranshaw, et al., Bridging the Gap between the Physical Location and Online Social Networks, In Proc. Ubicomp 2010, ACM Press (2010), <<http://www.eng.tau.ac.il/~eran/papers/Cranshaw_Bridging_the_Gap.pdf>>.

Eagle, et al., Community Computing: Comparisons between Rural and Urban Societies using Mobile Phone Data, IEEE Social Computing, 144-150, <<http://reality.media.mit.edu/pdfs/Eagle_community.pdf>>, 2009.

Estkowski, No Steiner Point Subdivision Simplification is NP-Complete, In Proceedings of the 10th Canadian Conference on Computational Geometry, pp. 11-20, 1998.

Graham, "GPS Gadgets Can Reveal More Than Your Location", Retrieved on Nov. 28, 2011 at <<http://www.google.com/#sclient=psy-ab&hl=en&source=hp&q=Graham%2C+GPS+Gadgets+Can+Reveal+More+Than+Your+Location&pbx=1&oq=Graham%2C+GPS+Gadgets+Can+Reveal+More+Than+Your+Location%22%2C+&aq=f&aqi=&aq1=&gs_sm=d&gs_up1=287016708I0I10I40I2I2I0I0I0I0I266I438I0.1.1I2I0&bav=on.2,or.r_gc.r_pw.,cf.osb&fp=533a712cc6ce8ba0&biw=1280&bih=808>>, 2008, pp. 1-2.

Guehnemann, et al., Monitoring traffic and emissions by floating car data. Institute of transport studies Australia; 2004, <<http://elib.dlr.de/6675/1/its_wp_04-07.pdf>>.

Kindberg, et al., Urban computing. Pervasive computing. IEEE Computer Society. 6, 3, pp. 18-20. Aug. 2007, <<http://ieeexplore.ieee.org/stamp/stamp.jsp?tp=&arnumber=4287439&userType=inst>>.

Kostakos, et al., Urban computing to bridge online and real-world social networks. Handbook of Research on Urban Informatics, 2008, <<http://hci.uma.pt/courses/ubicomp/papers/social/kostakos-08.pdf>>.

Lakhina, et al., Diagnosing Network-Wide Traffic Anomalies, In Proceedings of the SIGCOMM 2004 Conference, 12 pp., 2004 ACM.

Liao, et al., Anomaly Detection in GPS Data Based on Visual Analytics, Proceedings of the 2010 IEEE Symposium, Oct. 2010, pp. 51-58, <<http://web.siat.ac.cn/~baoquan/papers/GPSvas.pdf>>.

(56) References Cited

OTHER PUBLICATIONS

Nzouonta, et al, VANET Routing on City Roads using Real-Time Vehicular Traffic Information, IEEE Transactions on Vehicular Technology, vol. 58, No. 7, Sep. 2009, <<http://web.njit.edu/~gwang/publications/TVT09.pdf>>.

Rosenfeld, Connectivity in digital pictures, Journal of the ACM 17 (1): pp. 146-160, 1970.

Shekhar, et al., Unified approach to detecting spatial outliers, University of Helsinki 2007, 27 pages, <<http://www.cs.helsinki.fi/u/leino/opetus/spatial-k07/maksimainen.pdf>>.

Shklovski, et al., Urban Computing-Navigating Space and Context. IEEE Computer Society. 39 ,9, pp. 36-37, 2006 <<http://www.itu.dk/people/irsh/pubs/UrbanComputingIntro.pdf>>.

Sun, et al., On Local Spatial Outliers, Technical Report No. 549, Jun. 2004, <<http://sydney.edu.au/engineering/it/research/tr/tr549.pdf>>, 9 pages.

Wu, et al., Spatio-Temporal Outlier Detection in Precipitation Data, Knowledge Discovery from Sensor Data, pp. 115-133, 2010, <<http://sydney.edu.au/engineering/it/~ewu1/publications/WuLiuChawlaSensorKDD2008.pdf>>.

Ge, et al., An Energy-Efficient Mobile Recommender System. In Proc. KDD 2010, ACM Press 2010, <<http://pegasus.rutgers.edu/~kelixiao/papers/An%20Energy-Efficient%Mobile%20Recommender%20System.pdf>>.

Schofield, "It's GeoLife, Jim, But Not as we Know it", Guardian News, Retrieved on Nov. 28, 2011 at <<http:// www.guardian.co.uk/technology/2008/mar/13/microsoft.research/print>>, Mar. 12, 2008, 2 pgs.

Sun, et al., on Local Spatial Outliers, Technical Report No. 549, Jun. 2004, <<http://sydney.edu.au/engineering/it/ research/tr/tr549.pdf>>, 9 pages.

Office action for U.S. Appl. 12/567,667, mailed on Jul. 18, 2012, Zheng et al., "Recommending Points of Interests in a Region", 20 pages.

Jones et al, "P3 Systems: Putting the Place Back into Social Networks", IEEE Internet Computing, Sep.-Oct. 2005, 9 pgs.

Lee, et al., "TraClass: Trajectory Classification Using Hierarchical Region-Based and Trajectory-Based Clustering", retrieved on Aug. 4, 2009 at <<http://www.cs.uiuc.edu/homes/hanj/pdf/vldb08_jglee.pdf>>, ACM, VLDB 2008, vol. 1, Issue. 1, 2008, pp. 1081-1094.

Matsuo et al, "Inferring Long Term User Properties Based on Users' Location History", Proc 20th Intl Joint Conf on Artificial Intelligence, Jan. 2007, 7 pgs.

Office action for U.S. Appl. No. 13/324,758, mailed on Jan. 18, 2013, Zheng et al., "Urban Computing of Route-Oriented Vehicles", 48 pages.

Ward et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, 7 pages, retrieved Apr. 30, 2010 at <<http://www.cs.dartmouth,edu/-tanzeem/pubs/AAA1051WyattD.pdf>>., Wyatt et al.

Xie, "Understanding User Behavior Geospatially", Microsoft Research, Nov. 2008, 2 pgs.

Abowd et al., "Cyberguide: A mobile context-aware tour guide", Wireless Networks, vol. 3, retrieved on Apr. 30, 2010 at <<http://graphics.cs.columbia.edu/courses/mobwear/resources/p421-abowd-97.pdf>>, Oct. 1997, pp. 421-433.

Adomavicius, Tuzhilin, "Toward the Next Generation of Recommender Systems: A Survey of the State-of-the-Art and Possible Extensions", retrieved on Dec. 29, 2009 at <<http://www.inf.unibzit/~ ricci/ATIS/papers/state-of-the-art-2005.pdf>>, IEEE Transactions on Knowledge and Data Engineering, vol. 17, No. 6, Jun. 2005, pp. 734-749.

Agrawal, et al., "Mining Association Rules between Sets of Items in Large Databases", retrieved on Aug. 4, 2009 at <<http://rakesh.agrawal-family.com/papers/sigmod93assoc.pdf>>, ACM, Proceedings of SIGMOD 1993, Jun. 1993, pp. 207-216.

Agrawal, et al., "Mining Sequential Patterns", retrieved on Aug. 4, 2009 at <<http://www.almaden.ibm.com/cs/projects/iis/hbd/Publications/papers/icde95.ps.gz>>, Proceedings of ICDE 1995, Mar. 1995, 12 pgs.

Ahern, et al., "World Explorer: Visualizing Aggregate Data From Unstructured Text in Geo-Referenced Collections", In the Proceedings of the 7th ACM/IEEE-CS Joint Conference on Digital Libraries, 2007, pp. 1-10.

Amato, et al., "Region Based Image Similarity Search Inspired by Text Search", Third Italian Research Conference on Digital Library Systems, Padova, Italy, Jan. 29-30, 2007, pp. 78-85.

Ankerst et al., "OPTICS: Ordering Points to Identify the Clustering Structure", Proceedings of the ACM SIGMOD 1999 International Conference on Management of Data, Philadelphia, Pennsylvania, retrieved Apr. 30, 2010 at <<http://www.dbs.informatik.uni-muenchen.de/Publicationen/Papers/OPTICS.pdf>>, Jun. 1-3, 1999, 12 pages Belussi, et al, "Estimating the Selectivity of Spatial Queries Using the 'Correlation' Fractal Dimension", retrieved on Apr. 15, 2010 at <<http://www.vldb.org/conf/1995/P299.PDF>>, Proceedings of Conference on Very Large Data Bases (VLDB), Sep. 1995, pp. 299-310.

"Bikely Reviews", website, 2010, 1 page, retrieved on Apr. 16, 2010 at <<http://www.bikely.com/>>.

bing.com, Maps, Retrieved on Dec. 28, 2009 at <<http://cn.bing.com/ditu/>>, 2 pgs.

Bohm, "A Cost Model for Query Processing in High Dimensional Data Spaces", retrieved on Apr. 15, 2010 at <<http://www.dbs.informatik.uni-muenchen.de/~boehm/publications/tods-modeling.final.pdf>>, ACM Transactions on Database Systems, Jun. 2000, pp. 1-43.

Borzsonyi, et al., The Skyline Operator, In Proc. ICDE 2001, IEEE Press: 421-430, <<http://ieeexplore.ieee.org/stamp/stamp.jsp?tp=&amumber=914855>>.

Brakatsoulas, et al., "On Map-Matching Vehicle Tracking Data", VLDB Endowment, In the Proceedings of the 31st International Conference on Very Large Data Bases, Sep. 2005, pp. 853-864.

Brauckhoff, et al., Applying Pca for Traffic Anomaly Detection: Problems and Solutions, IEEE, 2009, 5 pp. Brkic, et al., Generative modeling of spatio-temporal traffic sign trajectories, Proceedings of the IEEE Conference on.

Brkic, et al., Generative modeling of spatio-temporal traffic sign trajectories, Proceedings of the IEEE Conference on Computer Vision and Pattern Recognition, 2010, pp. 25-31, <<http://www.zemris.fer.hr/~ssegvic/pubs/brkic10ucvp.pdf>>.

Brunato, Battiti, "A Location-Dependent Recommender System for the Web", retrieved on Dec. 29, 2009 at <<http://dit.unitn.it/~brunato/pubblicazioni/MobEA.pdf>>, MobEA Workshop, Budapest, May 2003, pp. 1-5.

Bu, et al., Efficient Anomaly Monitoring Over Moving Object Trajectory Streams, KDD 2009, ACM, 2009, 9 pages.

Cai, "Indexing Spatio-Temporal Trajectories with Chebyshev Polynomials", retrieved on Apr. 15, 2010 at <<http://www.cs.ubc.ca/~rng/psdepository/sigmod2004.pdf>>, ACM, Conference on Management of Data, Jun. 13-18, 2004, pp. 599-610.

Cao, et al., "Mining Frequent Spatio-temporal Sequential Patterns", retrieved on Aug. 4, 2009 at <<http://i.cs.hku.hk/~nikos/icdm05.pdf>>, IEEE Computer Society, ICDM 2005, Nov. 2005, pp. 82-89.

Chan, et al, "Efficient Time Series Matching by Wavelets", retrieved on Apr. 15, 2010 at <<http://infolab.usc.edu/csci599/Fall2003/Time%20Series/Efficient%20Time%20Series%20Matching%20by%20Wavelets.pdf, IEEE Computer Society, Proceedings of Conference on Data Engineering (ICDE), Mar. 1999, pp. 126-133.

Chawathe, "Segment-BAsed Map Matching", In the Proceedings of the IEEE Intelligent Vehicles Symposium, Jun. 13-15, 2007, pp. 1190-1197.

Chen et al., "GeoTV: Navigating Geocoded RSS to Create an IPTV Experience", Proceedings of the 16th International World Wide Web Conference (WWW 2007), Banff, Alberta, Canada, May 8-12, 2007, pp. 1323-1324, retrieved Apr. 30, 2010 at <<http://www2007.org/posters/poster1042.pdf>>.

(56) References Cited

OTHER PUBLICATIONS

Chen, et al., GLS-SOD: A Generalized Local Statistical Approach for Spatial Outlier Detection, Proceedings of KDD 2010, ACM, 2010, pp. 1069-1078.
Chen, et al, "On The Marriage of Lp-norms and Edit Distance", retrieved on Apr. 15, 2010 at <<http://www.google.co.in/url?sa=t&source=web&ct=res&cd=3&ved=0CBEQFjAC&url=http%3A%2F%2Fciteseerx.ist.psu.edu%2Fviewdoc%2Fdownload%3Fdoi%3D10.1.1.1.7443%26rep%3Drep1%26type%3Dpdf&rct=j&q=On+the+marriage+of+lp-norms+and+edit+distance&ei=_ezGS62IE439__Aa1qIzZDA&usg=AFQjCNHFZScVkE4uy1b_oC-Pr4ur7KIBdQ>>, Proceedings of Conference on Very Large Data Bases (VLDB), Aug. 29-Sep. 3, 2004, pp. 792-803.
Chen, et al, "Robust and Fast Similarity Search for Moving Object Trajectories", retrieved on Apr. 15, 2010 at <<http://citeseerx.ist.psu.edu/viewdoc/download;jsessionid=2C0EAC347F5F144727996-F29CEFD49FB?doi=10.1.1.94.8191&rep=rep1&type=pdf>>, ACM, Conference on Management of Data, Jun. 2005, pp. 491-502.
Chen et al., "Searching Trajectories by Locations—An Efficiency Study", 2010 Microsoft Research, to be presented at the ACM Conference on Management of Data (SIGMOD), Indianapolis, Indiana, Jun. 6-11, 2010, 12 pages, retrieved on Apr. 16, 2010 at <<http://www.itee.uq.edu.au/~zxf/_papers/sigmod299-chen.pdf>>.
Cranshaw, et al., Bridging the Gap between the Physical Location and Online Social Networks, In Proc. Ubicomp 2010, ACM Press (2010), <<http://www.eng.tau.acil/~eran/papers/Cranshaw_Bridging_the_Gap.pdf>>.
Das, et al., Anomaly Detection and Spatial-Temporal Analysis of Global Climate System, Proceedings of SensorKDD 2009, 9 pages, 2009 ACM.
Datta, et al., "Image Retrieval: Ideas, Influences, and Trends of the New Age", ACM Computing Surveys, vol. 40, No. 2, Article 5, Apr. 2008, pp. 1-60.
Deerwester, et al., "Indexing by Latent Semantic Analysis", J. Amer. Soc. Info. Sci., vol. 41, No. 6, Jan. 1990, 34 pages.
Ding et al, "Querying and Mining of Time Series Data: Experimental Comparison of Representations and Distance Measures", retrieved on Apr. 15, 2010 at <<http://www.vldb.org/pvldb/1/1454226.pdf>>, VLDB Endowment, PVLDB'08, Aug. 23-28, 2008, pp. 1542-1552.
Domain Name System (DNS), retrieved on Apr. 29, 2008 at <<http://www.unix.org.ua/orelly/networking/firewall/ch08_10.htm>>, Unix, pp. 1-11.
Domain Name System (DNS) A Guide to TCP/IP, retrieved at <<http://web.syr.edu/~djmolta/ist452/ch_07.ppt>>, Thomson Learning Course Technology, pp. 1-56.
Dubuisson et al., "A Modified Hausdorff Distance for Object Matching", Proceedings of the 12th IAPR International Conference on Pattern Recognition, Computer Vision & Image Processing, vol. 1, Oct. 9-13, 1994, pp. 566-568.
Eagle, et al., Community Computing: Comparisons between Rural and Urban Societies using Mobile Phone Data, IEEE Social Computing, 144-150, <<http://reality.media.mit.edu/pdfs/Eagle_community.pdf>>.
Eagle, et al., Reality mining: sensing complex social systems. Personal Ubiquitous Computing, 10, 4: 255-268, 2006. <<http://robotics.usc.edu/~sameera/CS546/readings/eagle_uc2006.pdf>>.
Espinoza et al, "GeoNotes: Social and Navigational Aspects of Location-Based Information Systems", Proc Ubicomp 3rd Intl Conf on Ubiquitous Computing, Oct. 2001, LNCS 2201, 16 pgs.
Estivill-Castro et al, "Data Mining Techniques for Autonomous Exploration of Large Volumes of Geo-referenced Crime Data", 6th International Conference on GeoCom.putation, University of Queensland, Brisbane, Australia, Sep. 24-26, 2001, 12 pages.
Estkowski, no. Steiner Point Subdivision Simplification is NP-Complete, In Proceedings of the 10th Canadian Conference on Computational Geometry, pp. 11-20, 1998.
Eustice et al, "The Smart Party: A Personalized Location Aware Multimedia Experience", Consumer Communications and Networking Conf, Jan. 2008, 5 pgs.

Faloutsos et al, "Fast Subsequence Matching in Time-Series Databases," Proceedings of the 1994 ACM SIGMOD International Conference on Management of Data, vol. 23, No. 2, Jun. 1994, 11 pgs.
"Flow Control Platform (FCP) Solutions", at <<http://k2colocation.com/network-services/fcp.cfm>>, K2 Colocation, 2005, pp. 2.
Frentzos et al, "Algorithms for Nearest Neighbor Search on Moving Object Trajectories", retrieved on Apr. 15, 2010 at <<http://infolab.cs.unipi.gr/pubs/journals/FGPT06-Geoinformatica.pdf>>, Kluwer Academic Publishers, Geoinformatica, vol. 11, No. 2, Jun. 2007, pp. 1-32.
Frentzos et al, "Index-based Most Similar Trajectory Search", retrieved on Apr. 15, 2010 at <<http://isl.cs.unipi.gr/pubs/TR/UNIPI-ISL-TR-2006-01.pdf>>, IEEE Conference on Data Engineering (Technical Report UNIPI-ISL-TR-2006-01), Jun. 2006, pp. 1-12.
Ge, et al., An Energy-Efficient Mobile Recommender System. In Proc. KDD 2010, ACM Press 2010, <<http://pegasus.rutgers.edu/~kelixiao/papers/An%20Energy-Efficient%20Mobile%20Recommender%20System.pdf>>.
Ge, et al., TOP-EYE: Top-k Evolving Trajectory Outlier Detection, Proceedings of CIKM 2010, Toronto, Canada, 4 pages.
Giannotti, et al., "Efficient Mining of Temporally Annotated Sequences", retrieved on Aug. 4, 2009 at <<http://www.siam.org/meetings/sdm06/proceedings/032giannottif.pdf>>, Proceedings of the Sixth SIAM Intl Conference on Data Mining, Apr. 2006, pp. 346-357.
Giannotti, et al., "Trajectory Pattern Mining", retrieved on Aug. 4, 2009 at <<http://cs.gmu.edu/~jessica/temp/p330-giannotti.pdf>>, ACM KDD'07, Aug. 2007, pp. 330-339.
"Global Server Load Balancing for Disaster Recovery, Business Continuity, Performance Optimization and Datacenter Management", at <<http://www.zeus.com/documents/en/ZXT/ZXTM_Global_Load_Balancer.pdf>>, Zeus Technology Limited, 1995-2007, pp. 4.
Goldberg, et al., "Computing the Shortest Path: A Search Meets Graph Theory", SODA'05 Proceedings of the Sixteenth Annual ACM-SIAM Symposium on Discrete Algorithms, Jan. 2005, pp. 156-165, 10 pgs.
Gonzalez, et al., "Adaptive Fastest Path Computation on a Road Network: A Traffic Mining Approach", ACM, In the Proceedings of the 33rd International Conference on Very Large Data Bases, Sep. 23-28, 2007, pp. 794-805.
Gonzalez, Hidalgo, Barabasi, "Understanding individual human mobility patterns Supplementary Material", retrieved on Dec. 29, 2009 at <<http://www.barabasilab.com/pubs/CCNR-ALB_Publications/200806-05_Nature-MobilityPatterns/200806-05_Nature-MobilityPatterns-SuppMat13.pdf>>, Nature, vol. 453, 2008, pp. 779-782.
GPS Sharing, retrieved Feb. 4, 2013 at http://web.archive.org/web/20071129224158/http://gpssharing.com, 2 pgs.
"GPS Track Route Exchange Forum", 2010 GPSXchange.com website, 3 pages, retrieved on Apr. 16, 2010 at <<http://www.gpsxchange.com/phpBB2/index.php>>.
"GPS-Waypoints", retrieved on Apr. 15, 2010 at <<http://www.gps-waypoints.net/>>, 2010, pp. 1.
Graham, "GPS Gadgets Can Reveal More Than Your Location", Retrieved on Nov. 28, 2011 at <<http://www.google.com/#sclient=psy-ab&hl=en&source=hp&q=Graham%2C+GPS+Gadgets+Can+Reveal+More+Than+Your+Location&pbx=1&oq=Graham%2C+GPS+Gadgets+Can+Reveal+More+Than+Your+Location%22%2C+&aq=f&aqi=&aql=&gs_sm=d&gs_upl=2870I6708I0I10140I2I2I0I0I0I0I266I438I0.1.1I2I0&bav=on.2,or.r_gc.r_pw.,cf.osb&fp=533a712cc6ce8ba8&biw=1280&bih=808>>, 2008, pp. 1-2.
Greenfeld, "Matching GPS Observations to Locations on a Digital Map", In the Proceedings of the 81st Annual Meeting of the Transportation Research Board, Washington DC, Jan. 2002, 13 pgs.
Guehnemann, et al., Monitoring traffic and emissions by floating car data. Institute of transport studies Australia; 2004, http://elib.dlr.de/6675/1/its_wp_04-07.pdf>>.
Gustavsen, "Condor—an application framework for mobility-based context-aware applications", retrieved on Aug. 4, 2009 at <<http://www.comp.lancs.ac.uk/~dixa/conf/ubicomp2002-models/pdf/Gustaysen-goteborg%20sept-02.pdf>>, UBICOMP 2002, 2002, pp. 1-6.
Gutman, "Reach-Based Routing: A New Approach to Shortest Path Algorithms Optimized for Road Networks", In the Proceedings of the

(56) References Cited

OTHER PUBLICATIONS

Sixth Workshop on Algorithm Engineering and Experiments and the First Workshop on Analytic Algorithmics and Combinatorics, New Orleans, LA, USA, Jan. 10, 2004, 12 pgs.
Guttman, "R-Trees: A Dynamic Index Structure for Spatial Searching", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fviewdoc%2Fdownload%3Fdoi%3D10.1.1.66.1675%26rep%3Drep1%26type%3Dpdf&rct=j&q=R-trees%3A+a+dynamic+index+structure+for+spatial+searching&ei=JfTGS6uRPJH0__AaCpICHDQ&usg=AFQjCNFtQttNVHCKYJQZcH052-KmCxlZ0g>>, ACM, Proceedings of Conference on Management of Data, 1984, pp. 47-57.
Han, et al., "Frequent pattern mining: current status and future directions", retrieved on Aug. 4, 2009 at <<http://www.springerlink.com/content/9p5633hm18x55867/fulltext.pdf>>, Springer Science+Business Media, LLC, 2007, pp. 55-86.
Hariharan et al, "NetTrust—Recommendation System for Embedding Trust in a Virtual Realm", ACM Recommender Systems, Oct. 2007, 6 pgs.
Hariharan, et al., "Project Lachesis: Parsing and Modeling Location Histories", ACM, In the Proceedings of GIScience, 2004, pp. 106-124.
Hart, et al., "A Formal Basis for the Heuristic Determination of Minimum Cost Paths", In the Proceedings of IEEE Transactions of Systems Science and Cybernetics, vol. 4, No. 2, Feb. 12, 2007 (First Publication 1968), pp. 100-107.
Hirose, et al., Network Anomaly Detection based on Eigen Equation Compression, In Proceedings of the 15th SIGKDD Conference on Knowledge Discovery and Data Mining, pp. 1185-1194, 2009 ACM. <<http://www.ibis.t.u-tokyo.ac.jp/yamanishi/ID361_Network_Anomaly_Detection.pdf>>.
Hjaltason, Samet, "Distance Browsing in Spatial Databases", retrieved on Apr. 15, 2010 at <<http://citeseerx.ist.psu.edu/viewdoc/download?doi=10.1.1.25.4224&rep=rep1&type=pdf>>, ACM Transactions on Database Systems, vol. 24, No. 2, Jun. 1999, pp. 265-318.
Horozov et al., "Using Location for Personalized POI Recommendations in Mobile Environments", Proceedings of the 2006 International Symposium on Applications and the Internet (SAINT 2006), Phoenix, Arizona, Jan. 23-27, 2006, pp. 124-129.
Huang, Shekhar, Xiong, "Discovering Co-location Patterns from Spatial Datasets: A General Approach", retrieved on Dec. 29, 2009 at <<http://www.spatial.cs.umn.edu/paper_ps/coloc-tkde.pdf, IEEE Transactions on Knowledge and Data Engineering, vol. 16, Issue 12, Dec. 2004, pp. 1472-1485.
Huang, et al., "Project Report (draft version) Spatial Outlier Detection", retrieved on Dec. 12, 2008 at <<http://www-users.cs.umn.edu~joh/csci8715/P6.pdf>>, Computer Science Department, University of Minnesota, 2004, pp. 1-8.
Intl Search Report for PCT/US2009/063023, mailed Jun. 10, 2010, 4 pgs.
Jan, Horowitz, Peng, "Using GPS Data to Understand Variations in Path Choice", retrieved on Apr. 15, 2010 at <<https://pantherfile.uwm.edu/horowitz/www/pathchoice.pdf>>, National Research Council, Transportation Research Record 1725, 2000, pp. 37-44.
Jarvelin et al, "Cumulated Gain Based Evaluation of IR Techniques", ACM Transactions on Information Systems, vol. 20, No. 4, Oct. 2002, 25 pgs.
Jing, et al., "Hierarchical Optimization of Optimal Path Finding for Transportation Applications", (University of Michigan Research Paper, 1996, pp. 269-276) In the Proceedings of the Fifth International Conference on Information and Knowledge Management, 1996, pp. 261-268.
Jones et al, "P3 Systems: Putting the Place Back into Social Networks"IEEE Internet Computing, Sep.-Oct. 2005, 9 pgs.
Kanoulas, Du, Xia, Zheng, "Finding Fastest Paths on a Road Network with Speed Patterns", retrieved on Dec. 24, 2009 at <<http://www.inf.unibz.it/dis/teaching/SDB/paper/kanoulasDXZ_icde06_fastestpath.pdf>>, IEEE Computer Society, Proceedings of Conference on Data Engineering (ICDE), 2006, pp. 1-10.
Kavouras, et al., "A Method for the Formalization and Integration of Geographic Categorizatons", Draft version from the International Journal of Geographic Information Science, vol. 16, No. 5, 2002, pp. 439-453.
Ke, et al., "Correlated Pattern Mining in Quantitative Databases", ACM Transactions on Database Systems, vol. V, No. N, Apr. 2008, 44 pages.
Ke, et al., "Efficient Correlations Search from Graph Databases", IEEE Transactions on Knowledge and Data Engineering, vol. 20, Issue 12, Dec. 2008, pp. 1601-1615.
Kharrat, Popa, Zeitouni, Faiz, "Clustiering Algorithm for Network Constraint Trajectories", retrieved on Apr. 15, 2010 at <<http://www.prism.uvsq.fr/~karima/papers/SDH_08.pdf>>, Springer Berlin, Symposium on Spatial Data Handling (SDH), 2008, pp. 631-647.
Kindberg, et al., Urban computing. Pervasive computing. IEEE Computer Society. 6, 3, pp. 18-20. Aug. 2007, <<http://ieeexplore.ieee.org/stamp.jsp?tp=&arnumber=4287439&userType=inst>>.
Korn, Pagel, Faloutsos, "On the 'Dimensionality Curse' and the 'Self-Similarity Blessing'", retrieved on Apr. 15, 2010 at <<http://www.informedia.cs.cmu.edu/documents/korn_dimcurse_2001.pdf>>, IEEE Educational Activities Department, Transactions on Knowledge and Data Engineering, vol. 13, No. 1, Jan. 2001, pp. 96-111.
Kostakos, et al., Urban computing to bridge online and real-world social networks. Handbook of Researched on Urban Informatics, 2008, <<http://hci.uma.pt/courses/ubicomp/papers/social/kostakos-08.pdf>>.
Kou, et al., "Spatial Weighted Outlier Detection", retrieved on Dec. 12, 2008 at <<http://www.siam.org/proceedings/datamining/2006/dm06_072kouy.pdf>>, SIAM Conference on Data Mining, 2006, pp. 614-618.
Krumm, et al., "LOCADIO: Inferring Motion and Location from Wi-Fi Signal Strengths", retrieved on Aug. 4, 2009 at <<http://research.microsoft.com/en-us/um/people/horvitz/locadio.pdf>>, Proceedings of Mobiquitous 2004, 2004, pp. 4-13.
Krumm, et al., "Predestination: Inferring Destinations from Partial Trajectories", retrieved on Aug. 4, 2009 at <<http://research.microsoft.com/en-us/um/people/horvitz/predestination.pdf>>, UBICOMP 2006, 2006, pp. 1-18.
Krumm, et al., "Predestination: Where Do You Want to Go Today?", retrieved on Aug. 4, 2009 at <<http://research.microsoft.com/en-us/um/people/horvitz/predestination-ieee.pdf>>, IEEE Computer Magazine, vol. 40, No. 4, Apr. 2007, pp. 105-107.
Lakhina, et al., Diagnosing Network-Wide Traffic Anomalies, In Proceedings of the SIGCOMM 2004 Conference, 12 pages, 2004 ACM.
Lavondes, et al., "Geo::PostalAddress—Country-specific postal address parsing/formatting", retrieved on Dec. 16, 2008 at <<http://search.cpan.org/~pauamma/Geo-Postal Address-0.04/PostalAddress.pm>>, CPAN, 2004, pp 1-8.
Lee et al, "Efficient Mining of User Behaviors by Temporal Mobile Access Patterns", Intl Journal of Computer Science and Network Security, vol. 7, No. 2, Feb. 2007, 7 pgs.
Lee, et al., "TraClass: Trajectory Classification Using Hierarchical Region-Based and Trajectory-Based Clustering", retrieved on Aug. 4, 2009 at <<http://www.cs.uiuc.edu/homes/hanj/pdf/vldb08_jglee.pdf, ACM, VLDB 2008, vol. 1, Issue 1, 2008, pp. 1081-1094.
Lee, et al., Trajectory Clustering: A Partition-and-group Framework, In Proceedings of the 26th ACM SIGMOD International Conference on Management of Data 2007, pp. 593-604, 2007.
Lee, et al., "Trajectory Outlier Detection: A Partition-and-Detect Framework", retrieved on Aug. 4, 2009 at <<http://www.cs.uiuc.edu/homes/hanj/pdf/icde08_jaegil_lee.pdf>>, IEEE Computer Society, ICDE 2008, 2008, pp. 1-10.
Lemire, Maclachlan, "Slope One Predictors for Online Rating-Based Collaborative Filtering", retrieved on Dec. 29, 2009 at <<http://www.daniel-lemire.com/fr/documents/publications/lemiremaclachlan_sdm05.pdf>>, SIAM Proceedings of Data Mining (SDM), 2005, pp. 1-5.
Li, et al., "A Connectivity-Based Map Matching Algorithm", AARS, Asian Journal of Geoinformatics, 2005, vol. 5, No. 3, pp. 69-76.

(56) References Cited

OTHER PUBLICATIONS

Li et al., "Mining User Similarity Based on Location History", ACM Conference on Advances in Geographic Information Systems (ACM GIS 2008), Irvine, California, Nov. 5-7, 2008, Article 34, 10 pages, retrieved on Apr. 16, 2010 at <<http://research.microsoft.com/pubs/74369/Mining%20user%20similarity%20based%20on%-20locaton%20history.pdf>>.

Li, et al., Temporal Outlier Detection in Vehicle Traffic Data, Proceedings of the 2009 IEEE International Conference on Data Engineering, pp. 1319-1322, <<http://www.cs.uiuc.edu/~hanj/pdf/icde09_xli.pdf>>.

Li, et al., "Traffic Density-Based Discovery of Hot Routes in Road Networks", Springer-Verlag, Advances in Spatial and Temporal Databases, 2007, pp. 441-459.

Liao, et al., Anomaly Detection in GPS Data Based on Visual Analytics, Proceedings of the 2010 IEEE Symposium, Oct. 2010, pp.51-58, <<http://web.siat.ac.cn/~baoquan/papers/GPSvas.pdf>>.

Liao, et al., "Building Personal Maps from GPS Data", retrieved on Aug. 4, 2009 at <<http://luci.ics.uci.edu/predeployment/websiteContent/weAreLuci/biographies/faculty/djp3/LocalCopy/JR-004.pdf>>, Proceedings of IJCAI MOO 2005, 2005, pp. 249-265.

Liao, et al., "Learning and Inferring Transportation Routines", Elsevier, Artificial Intelligence, vol. 171, Issues 5-6, Apr. 2007, pp. 311-331.

Liao et al., "Learning and Inferring Transportation Routines", American Association for Artificial Intelligence Press (AAAI) 19th National Conference on Artificial Intelligence, San Jose, California, Jul. 25-29, 2004, pp. 348-353, retrieved on Apr. 16, 2010 at <<http://www.cs.rochester.edu/~kautz/papers/gps-tracking.pdf>>.

Liao et al., "Location-based Activity Recognition", Proceedings of the 19th Annual Conference on Neural Information Processing Systems (NIPS-2005), Whistler, British Columbia, Canada, Dec. 5-10, 2005, 8 pages, retrieved on Apr. 16, 2010 at <<http://books.nips.cc/papers/files/nips18/NIPS2005_0773.pdf>>.

Linden et al, "Amazon.com Recommendations, Item to Item Collaborative Filtering", IEEE Internet Computing, Jan. and Feb. 2003, 5 pgs.

Linden, "The End of Federated Search?", at <<http://glinden.blogspot.com/2007/03/end-of-federated-search.html>>, Mar. 24, 2007, pp. 9.

Lippi, et al., Collective Traffic Forecasting, Proceedings of the European Conference on Machine Learning and Principles and Practice of Knowledge Discovery Database, ECML PKDD 2010, pp. 259-273, 2010.

Liu, et al., Uncovering cabdrivers' behavior patterns from their digital traces, Computers, Environment and Urban Systems, 2010.

Lozano, et al., Spatial-temporal Causal Modeling for Climate Change Attribution, KDD 2009, Paris France, ACM 2009, 10 pages.

Mamoulis, Cao, Kollios, Hadjieleftheriou, Tao, Cheung, "Mining, Indexing, and Querying Historical Spatiotemporal Data", retrieved on Dec. 29, 2009 at <<http://i.cs.hku.hk/~nikos/sigkdd2004_1.pdf>>, ACM Proceedings of Conference on Knowledge Discovery and Data Mining (KDD), Aug. 22, 2004, pp. 236-245.

Manning et al., "An Introduction to Information Retrieval", DRAFT, Cambridge University Press, Apr. 1, 2009, 581 pages, retrieved on Apr. 16, 2010 at <<http://nlp.stanford.edu/IR-book/pdf/irbookonlinereading.pdf>>.

Markowetz, et al., "Design and Implementation of a Geographic Search Engine", Eighth International Workshop on the Web Databases (WebDB 2005), Baltimore, MD, Jun. 16-17, 2005, Baltimore, MD, 6 pages.

Masoud, et al., "Fast Algorithms for Outlier Detection", retrieved on Dec. 12, 2008 at <<http://www.scipub.org/fulltext/jcs/ jcs42129-132.pdf>>, Journal of Computer Science, vol. 4, No. 2, 2008, pp. 129-132.

Matsuo et al, "Inferring Long Term User Properties Based on Users' Location History ", Proc 20th Intl Joint Conf on Artificial Intelligence, Jan. 2007, 7 pgs.

McDonald et al, "Expertise Recommender: A Flexible Recommendation System and Architecture", CSCW 2000, Dec. 2000, 10 pgs.

McKeown, et al., "Integrating Multiple Data Representations for Spatial Databases", retrieved on Dec. 12, 2008 at <<http://mapcontext.com/autocarto/proceedings/auto-carto-8/pdf/integrating-multiple-data-representations-for-spatial-databases.pdf>>, Auto Carlo 8 Conference Proceedings (ASPRS and ACSM), 1987, pp. 754-763.

Michael et al, "Location Based Intelligence—Modeling Behavior in Humans Using GPS", Proc Intl Symposium on Technology and Society, Jun. 2006, 8 pgs.

Miller, "Analysis of Fastest and Shortest Paths in an Urban City Using Live Vehicle Data from a Vehicle-to-Infrastructure Architecture", retrieved on Dec. 24, 2009 at <<http://www.sigmacoding.com/jeff/publications/fastest-path-ifac09.pdf>>, Federation on Automatic Control Symposium on Control in Transportation Systems (IFAC), Sep. 2009., pp. 1-5.

Min-qi, et al., "An Algorithm for Spatial Outlier Detection Based on Delaunay Triangulation", In the Proceedings of the 2008 International Conference on Computational Intelligence and Security, 2008, pp. 102-107.

Miyaki, et al., "Tracking Persons Using Particle Filter Fusing Visual and Wi-Fi Localizations for Widely Distributed Camera", retrieved on Aug. 4, 2009 at <<http://ieeexplore.ieee.org/stamp/stamp.jsp?arnumber=04379287>>, IEEE Intl Conference on Image Processing, ICIP 2007, vol. 3, 2007, pp. 225-228.

Monreale, et al., "WhereNext: a Location Predictor on Trajectory Pattern Mining", retrieved Aug. 4, 2009 at <<http://delivery.acm.org/10.1145/1560000/1557091/p637-monreale.pdf?key1=1557091&key2=5182739421&coll=GUIDE&dl=Guide&CFID=47499709&CFTOKEN=90308932>>, ACM, KDD 2009, 2009, pp. 637-645.

Morimoto, "Mining Frequent Neighboring Class Sets in Spatial Databases", retrieved on Dec. 29, 2009 at <<http://delivery.acm.org/10.1145/510000/502564/p353-morimoto.pdf?key1=502564&key2=1634712621&coll=GUIDE&dl=GUIDE&CFID=70432903&CFTOKEN=93744375>>, ACM Proceedings of Conference on Knowledge Discovery and Data Mining (KDD), 2001, pp. 353-358.

Morse, Patel, "An Efficient and Accurate Method for Evaluating Time Series Similarity", retrieved on Apr. 15, 2010 at <<http://www.eecs.umich.edu/db/files/sigmod07timeseries.pdf>>, ACM, Proceedings of Conference on Management of Data, Jun. 11, 2007, pp. 569-580.

Nicholson, "Finding the Shortest Route Between Two Points in a Network", British Computer Society, The Computer Journal, 1966, vol. 9, No. 3, pp. 275-280.

Nzouonta, et al, VANET Routing on City Roads using Real-Time Vehicular Traffic Information, IEEE Transactions on Vehicular Technology, vol. 58, No. 7, Sep. 2009, <<http://web.njitedu/~gwang/publications/TVT09.pdf>>.

Office Action for U.S. Appl. No. 12/041,599, mailed on Jul. 25, 2011, Arne Josefsberg, "Failover in an Internet Location Coordinate Enhanced Domain Name System".

Office Action for U.S. Appl. No. 12/037,347, mailed on Aug. 17, 2011, Yu Zheng, "System for Logging Life Experiences Using Geographic Cues", 9 pgs.

Office action for U.S. Appl. No. 13/324,758, mailed on Jan. 18, 2013, Zheng et al., "Urban Computing of Route Oriented Vehicles", 48 pages.

Office action for U.S. Appl. No. 12/711,130, mailed on Oct. 4, 2012, Zheng et al., "Mining Correlation Between Locations Using Location History", 15 pages.

Office action for U.S. Appl. No. 13/188,013, mailed on Nov. 15, 2011, Josefsberg et al., "Internet Location Coordinate Enhanced Domain Name System", 14 pages.

Office Action for U.S. Appl. No. 12/562,588, mailed on Dec. 8, 2011, Yu Zheng, "Mining Life Pattern Based on Location History", 31 pgs.

Office action for U.S. Appl. No. 12/353,940, mailed on Feb. 28, 2013, Zheng et al., "Detecting Spatial Outliers in a Location Entity Dataset", 9 pages.

Office Action for U.S. Appl. No. 12/041,599, mailed on Feb. 9, 2012, Arne Josefsberg, "Failover in an Internet Location Coordinate Enhanced Domain Name System", 27 pgs.

(56) References Cited

OTHER PUBLICATIONS

Office Action for U.S. Appl. No. 12/353,940, mailed on Mar. 23, 2012, Yu Zheng, "Detecting Spatial Outliers In a Location Entity Dataset", 6 pgs.

Office Action for U.S. Appl. No. 12/773,771, mailed on Mar. 26, 2012, Yu Zheng, "Collaborative Location and Activity Recommendations", 9 pgs.

Office Action for U.S. Appl. No. 12/711,130, mailed on Mar. 27, 2012, Yu Zheng, "Mining Correlation Between Locations Using Location History", 14 pgs.

Office action for U.S. Appl. No. 12/567,667, mailed on Jul. 18, 2012, Zheng et al., "Recommending Points of Interests in a Region", 20 pages.

Office Action for U.S. Appl. No. 12/712,053, mailed on Aug. 15, 2012, Zheng et al., "Route Computation Based on Route-Oriented Vehicle Trajectories", 17 pages.

Office action for U.S. Appl. No. 12/041,599, mailed on Sep. 21, 2012, Josefsberg et al., "Failover in an Internet Location Coordinate Enhanced Domain Name System", 9 pages.

Park, et al., CoDNS: Improving DNS Performance and Reliability via Cooperative Lookups, retrieved at <<http://www.cs.princeton.edu/nsg/papers/codns_osdi_04/paper.pdf>>, Princeton University, pp. 1-16.

Park et al., "Location-Based Recommendation System Using Bayesian User's Preference Model in Mobile Devices", J. Indulska et al. (Eds.): UIC 2007, LNCS 4611, pp. 1130-1139, retrieved on Apr. 30, 2010 at <<http://sclab.yonsel.ac.kr/publications/paper/IC/UIC07-MHPark.pdf>>.

Patterson, et al., "Inferring High-Level Behavior from Low-Level Sensors", Springer-Verlag Berlin Heidelberg, Lecture Notes in Computer Science, International Conference on Ubiquitous Computing, 2003, vol. 2864, pp. 73-89.

Patterson, et al., "Inferring High-Level Behavior from Low-Level Sensors", retrieved on Aug. 4, 2009 at <<http://www.cs.rochester.edu/u/kautz/papers/High-Level-140.pdf>>, UBICOMP 2003, pp. 1-18.

Pelekis, et al., Unsupervised Trajectory Sampling, Proceedings of the European Conference on Machine Learning and Principles and Practice of Knowledge Discovery in Databases ECML PKDD 2010, pp. 17-33, 2010.

Pfoser et al., "Novel Approaches in Query Processing for Moving Object Trajectories", Proceedings of the 26th International Conference on Very Large Data Bases (VLDB 2000), Cairo, Egypt, Sep. 10-14, 2000, pp. 395-406.

Pfoser, et al., "Capturing the Uncertainty of Moving-Object Representations", Springer-Verlag, In the Proceedings of the 6th International Symposium on Advances in Spatial Databases, Lecture Notes in Computer Science, 1999, vol. 1651, pp. 111-131.

Popivanov, et al., "Similarity Search Over Time-Series Data Using Wavelets", Proceedings of the 18th International Conference on Data Engineering (ICDE'02), IEEE Computer Society, San Jose, CA, Feb. 26-Mar. 1, 2002, 10 pages.

Quddus, et al."Current Map-Matching Algorithms for Transport Applications: State-of-the-Art and Future Research Directions", Elsevier Ltd., Transportation Research Part C: Emerging Technologies, 2007, vol. 15, Issue 5, pp. 312-328.

Rekimoto, et al., "LifeTag: WiFi-based Continuous Location Logging for Life Pattern Analysis", retrieved on Aug. 4, 2009 at <<http://209.85.229.132/search?q=cache:fCil8hzKWxQJ:www.sonycsl.co.jp/person/rekimoto/papers/loca07.pdf+mining+individual+life+pattern+based+on+location+history&cd=5&hl=en&ct=clnk&gl=uk>>, LoCA 2007, 2007, pp. 35-49.

Ringberg, et al., Sensitivity of PCA for Traffic Anomaly Detection, SIGMETRICS 2007, pp. 109-120.

Rosenfeld, Connectivity in digital pictures. Journal of the ACM (JACM), 17(1):160, 1970.

Rosenfeld, Connectivity in digital pictures, Journal of the ACM 17 (1): pp. 146-160, 1970

Roussopoulos, Kelley, Vincent, "Nearest Neighbor Queries", retrieved on Apr. 15, 2010 at <<http://www.cs.umd.edu/~nick/papers/nncolor.pdf>>, ACM, Presentation: Conference on Management of Data, 1995, pp. 1-23.

Saltenis, "Outlier Detection Based on the Distribution of Distances between Data Points", retrieved on Dec. 12, 2008 at <<http://www.mii.It/informatica/pdf/INFO558.pdf>>, INFORMATICA, vol. 15, No. 3, 2004, pp. 399-410.

Salton, et al., "A Vector Space Model for Automatic Indexing ", Communications of the ACM, vol. 187, No. 11, Nov. 1975, pp. 613-620.

Salton, "Dynamic Document Processing", Communications of the ACM, vol. 15, Issue 7, Jul. 1972, pp. 658-668.

Sarwar et al, "Application of Dimensionality Reduction in Recommender System, A Case Study", ACM WebKDD Workshop, Aug. 2000, 12 pgs.

Schofield, "It's GeoLife, Jim, But Not as we Know it", Guardian News, Retrieved on Nov. 28, 2011 at <<http://www.guardian.co.uk/technology/2008/mar/13/microsoft.research/print>>, Mar. 12, 2008, 2 pgs.

Schonfelder, "Between Routines and Variety Seeking: The Characteristics of Locational Choice in Daily Travel", retrieved on Dec. 12, 2008 at <<http://www.ivt.ethz.ch/vpl/publications/reports/ab192.pdf>>, 10th International Conference on Travel Behaviour Research, Aug. 10-15, 2003, pp. 1-32.

"Share My Routes", retrieved on Apr. 15, 2010 at <<http://www.sharemyroutes.com/>>, 2010, pp. 1-2.

Shekhar, et al., "Data Mining for Selective Visualization of Large Spatial Datasets", In the Proceedings of the 14th IEEE International Conference on Tools with Artificial Intelligence, 2002, pp. 41-48.

Shekhar, et al., Unified approach to detecting spatial outliers, University of Helsinksi 2007, 27 pages, <<http://www.cs.helsinki.fi/u/opetus/spatial-k07/maksimainen.pdf>>.

Sherkat, Rafiei, "On Efficiently Searching Trajectories and Archival Data for Historical Similarities", retrieved on Apr. 15, 2010 at <<http://webdocs.cs.ualberta.ca/~drafiei/papers/vldb08.pdf>>, VLDB Endowment, Proceedings of Conference on Very Large Data Bases (VLDB), vol. 1, No. 1, Aug. 24, 2008, pp. 896-908.

Shkovski, et al., Urban Computing-Navigating Space and Context. IEEE Computer Society. 39, 9, pp. 36-37, 2006 <<http://www.itu.dk/people/irsh/pubs/UrbanComputingIntro.pdf>>.

Simon, Frohlich, "A Mobile Application Framework for the geospatial Web", retrieved on Apr. 16, 2010 at <<http://www2007.org/papers/paper287.pdf>>, ACM Proceedings of World Wide Web Conference (WWW), May 8, 2007, pp. 381-390.

Singh et al., "Relational Learning via Collective Matrix Factorization", Proceedings of the 14th ACM SIGKDD International Conference on Knowledge Discovery and Data Mining, Las Vegas, Nevada, Aug. 24-27, 2008, pp. 650-658, retrieved on Apr. 30, 2010 at <<http://www.cs.cmu.edu/-ggordon/CMU-ML-08-109.pdf>>.

Sohn, et al., "Mobility Detection Using Everyday GSM Traces", retrieved on Aug. 4, 2009 at <<http://www.placelab.org/publications/pubs/mobility-ubicomp2006.pdf>>, UBICOMP 2006, 2006, pp. 212-224.

Spertus et al, "Evaluating Similarity Measures: A Large Scale Study in the Orkut Social Network", Proc 11th ACM SIGKDD Intl Conf on Knowledge Discovery in Data Mining, Aug. 2005, 7 pgs.

Srebro et al., "Weighted Low-Rank Approximations", Proceedings of the 20th International Conference on Machine Learning (ICML-2003). Washington, DC, Aug. 21-24, 2003, 8 pages, retrieved on Apr. 30, 2010 at <<http://people.scail.mit.edu/tommi/papers/SreJaa-icml03.pdf>>.

Sun, et al., On Local Spatial Outliers, Technical Report Number 549, Jun. 2004, <<http://sydney.edu.au/engineering/it/research/tr/tr549.pdf>>, 9 pages.

Tai et al., "Recommending Personalized Scenic Itinerary with Geo-Tagged Photos", ICME, 2008, 4 pages.

Takeuchi et al., "CityVoyager: An Outdoor Recommendation System Based on User Location History", Proceedings of the 3rd International Conference on Ubiquitous Intelligence and Couputing (UIC 2006), Wuhan, China, Sep. 3-6, 2006, pp. 625-636.

Takeuchi et al., "An Outdoor Recommendation System Based on User Location History", Proceedings of the 1st International Work-

(56) References Cited

OTHER PUBLICATIONS shop on Personalized Context Modeling and Management for UbiComp Applications (ubiPCMM 2005), Tokyo, Japan Sep. 11, 2005, pp. 91-100, retrieved Apr. 16, 2010 at <<http://docs.google.com/viewer?a=v&q=cache:YIN-In6ZcXMJ:citeseerx.ist.psu.edu/viewdoc/download%3Fdoi%3D10.1.1.91.813%26rep%3Drep1%-26type%3Dpdf+An+outdoor+recommendation+system+based+on+user+location.

Taylor, et al., "Virtual Differential GPS & Road Reduction Filtering by Map Matching", In the Proceedings of ION'99 Twelfth International Technical Meetings of the Satellite Division of the Institute of Navigation, 1999, pp. 1675-1684.

Tsoukatos, et al., "Eddicient Mining of Spatiotemporal Patterns", Proceedings of the 7th International Symposium on Spatial and Temporal Databases LNCS 2121, Redondo Beach, CA, Jul. 12-15, 2001, pp. 425-442.

Vlachos, Kollios, Gunopulos, "Discovering Similar Multidimensional Trajectories", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fviewdoc%2Fdownload%3Fdoi%3D10.1.1.106.1984%26rep%3Drep1%26type%3Dpdf&rct=j&q=Discovering+similar+multidimensional+trajectories&ei=ivfGS6HCM4uj_ga3wOiBDQ&usg=AFQjNG20j6K3s_WuY-VhWeDjlPYpgxv1Q>>, IEEE Computer Society, Proceedings of Conference on Data Engineering (ICDE), 2002, pp. 673-684.

Wang et al., "An Optimized Location-based Mobile Restaurant Recommend and Navigation System," WSEAS Transactions on Information Science and Applications, vol. 6, Issue 5, May 2009, pp. 809-818, retrieved on Apr. 16, 2010 at <<http://www.wseas.us/e-library/translations/information/2009/29-186.pdf>>.

Wang, et al., "CLOSET+: Searching for the Best Strategies for Mining Frequest Closed Itemsets", retrieved on Aug. 4, 2009 at <<http://www.cs.umd.edu/~samir/498/wang03closet.pdf>>ACM, SIGKDD 2003, 2003, pp. 236-245.

Wang et al., "Unifying User-based adn Item-based Collaborative Filtering Approaches by Similarity Fusion", Proceedings of the 29th Annual International ACM SIGIR Conference on Research and Development in Information Retrieval, Seattle, Washington, Aug. 6-11, 2006, pp. 501-508, retrieved on Apr. 30, 2010 at <<http://ict.ewi.tudelft.nl/pub/jun/sigir06_similarityfusion.pdf>>.

Ward et al., "Unsupervised Activity Recognition Using Automatically Mined Common Sense", American Association for Artifical Intelligence (AAAI 2005), Proceedings of the 20th National Conference on Artifical Intelligence, Pittsburgh, Pennsylvania, Jul. 9-13, 2005, 7 pages, retrieved Apr. 30, 2010 at <<http://www.cs.dartmouth,edu/-tanzeem/pubs/AAA1051WyattD.pdf>>.

Wikipedia, "Operating System", retrived from <<http://en.wikipedia.org/wiki/Operating_system>> on Oct. 8, 2010, pp. 1-17.

Wu, et al., Spatio-Temporal Outlier Detection in Precipitation Data, Knowledge Discovery from Sensor Data, pp. 115-133, 2010, <<http://sydney.edu.au/engineering/it/~ewu1/publications/WuLiuChawlaSensorKDD2008.pdf>>.

Xiao, Xie, Luo, Ma, "Density Based Co-Location Pattern Discovery", retrieved on Dec. 29, 2009 at <<http://www.cse.ust.hk/~xiaoxy/pub/gis-08.pdf>>, ACM Proceedings of Conference on Advances in Geographic Information Systems (SIGSPATIAL), OLAP and co-location mining, Article 29, Nov. 5, 2008, pp. 1-10.

Xie, Zheng, "GeoLife: Building social networks using human history", retrieved on Apr. 15, 2010 at <<http://research.microsoft.com/en-us/projects/geolife/>>, Microsoft Corporation, 2010, pp. 1-8.

Xie, "Understanding User Behavior Geospatially", Microsoft Research, Nov 2008, 2 pgs.

Xue, "Efficient Similarity Search In Sequence Database", retrieved on Apr. 15, 2010 at <<http://www.cs.uwaterloo.ca/~david/cs848/presentation-similarity-fengxue.pdf>>, University of Waterloo, Ontario Canada, Course Paper: CS 860 Topics in Database Systems, Nov. 18, 2009, pp. 1-7.

Yan, et al., "Clospan: Mining Closed Sequential Patterns in Large Datasets", retrieved Aug. 4, 2009 at <<http://citeseerx.ist.psu.edu/viewdoc/download;jsessionid=AFADA02A222CC497F30-CEC7317F6C7A5?doi=10.1.1.12.3538&rep=rep1&pdf>>, Proceedings of SIAM Int. Conference on Data Mining, SDM 2003, 2003, pp. 166-177.

Yan, et al., Discovery of frequent substructures, Wiley-Interscience, 2007, 99-113.

Yan, et al., "Feature-based Similarity Search in Graph Structures", ACM Translations on Database Systems, vol. V, No. N, Jun. 2006, 36 pages.

Yavas, et al., "A data mining approach for location prediction in mobile environments", retrieved on Aug. 4, 2009 at <<http://www.cs.bilkent.edu.tr/~oulusoy/dke05.pdf>>, Elsevier B.V., 2004, pp. 121-146.

Ye, et al., "Mining Individual Life Pattern Based on Location History," Tenth International Conference on Mobile Data Management: Systems, Services and Middleware, May 18-20, 2009, Taipei, 10 pages.

Yegulalp, Change the Windows 2000 DNS cache, retrieved on Apr. 29, 2008 at <<http://searchwincomputing.techtarget.com/tip/0,289483,sid68_gci1039955,00.html>>, SearchWinComputing.com, pp. 1-3.

Yi, Jagadish, Faloutsos, "Efficient Retrieval of Similar Time Sequences under Time Warping", retrieved on Apr. 15, 2010 at <<http://www.google.com/url?sa=t&source=web&ct=res&cd=3&ved=0CBYQFjAC&url=http%3A%2F%2Fciteseerx.ist.psu.edu%2Fviewdoc%2Fdownload%3Fdoi%3D10.1.1.105.6211%26rep%3Drep1%26type%3Dpdf&rct=j&q=Efficient+retrieval+of+similar+time+sequences+under+time+warping&ei=4ffGS5ShA4_0_Aalk5z8DA&usg=AFQjCNEkCq5vQwgb60QfZmT_RWcgMZ2YNA>>, IEEE Computer.

Yuxiang, et al., Detecting Spatio-temporal Outliers in Climate Dataset: A Method Study, IEEE 2005, pp. 760-763.

Zhang, et al., "A Taxonomy Framework for Unsupervised Outlier Detection Techniques for Multi-Type Data Sets" Technical Report TR-CTIT-07-79, Centre for Telematics and Information Technology University of Twente, Enschede, 2007, 40 pgs.

Zhang, Mamoulis, Cheung, Shou, "Fast Mining of Spatial Collocations", retrieved on Dec. 29, 2009 at <<http://i.cs.hku.hk/~dcheung/publication/sigkdd2004_2.pdf>>, ACM Proceedings of Conference on Knowledge Discovery and Data Mining (SIGKDD), Aug. 22, 2004, pp. 384-393.

Zhang, et al., iBAT: Detecting Anomalous Taxi Trajectories from GPS Traces, Proceedings of UbiComp Sep. 2011, 10 pages.

Zhang, et al., "Mining Non-Redundant High Order Correlations in Binary Data", International Conference on Very Large Data Bases (VLDB), Aukland, NZ, Aug. 23-28, 2008, pp. 1178-1188.

Zhang, et al., Network Anomography, USENIX Association, Internet Measurement Conference 2005, pp. 317-330.

Zhao, et al., "Searching for Interacting Features", Proceedings of the 20th International Joint Conference on Artificial Intelligence, Hyderabad, India, Jan. 6-12, 2007, pp. 1156-1161.

Xheng et al., "Collaborative Filtering Meets Mobile Recommendation: A User-centered Approach", to be presented at the Association for the Advancement of Artifical Intelligence (AAAI) 24th Conference on Articial Intelligence, Atlanta, Georgia, Jul. 11-15, 2010, 6 pages., retrieved on Apr. 16, 2010 at <<http://research.micrsoft.com/pubs/122244/AAI10-Collaborative%20Filtering%20Meets%20Mobile%-20Recommendation%20A%20A%20User-centered%20Approach.pdf>>.

Zheng, et al., GeoLife: A Collaborative Social Networking Service Among User, Location and Trajectory. IEEE Date Engineer Bulletin, 33(2). IEEE press 2010, 32-40, <<http://sites.computer.org/debull/A10june/geolife.pdf>>.

Zheng, et al., "GeoLife: Managing and Understanding your Past Life over Maps", IEEE Computer Society, In the Proceedings of the Ninth International Confernence on Mobile Data Management, 2008, pp. 211-212, 2 pgs.

Zheng, Wang, Zhang, Xie, Ma, "GeoLife: Managing and Understanding Your Past Life over Maps", retrieved on Dec. 29, 2009 at <<http://research.micrsoft.com/en-us/people/yuzheng/zheng-geolife-managing_and_understanding_your_past_life_over_map.pdf>>, IEEE Computer Society, Proceedings of Conference on Mobile Data Manage, 2008, pp. 211-212.

Zheng et al., "GeoLife2.0: A Location-Based Social Networking Service", Proceedings of the 10th International Conference on

(56) References Cited

OTHER PUBLICATIONS

Mobile Data Management Systems, Services and Middleware, Taipei, Taiwan, May 18-20, 2009, pp. 357-358, retrieved on Apr. 16, 2010 at <<http://ieeexplore.ieee.org/stamp/stamp.jsp?tp=&arnumber=5088957>>.
Zheng et al., "Joint Learning User's Activities and Profiles from GPS Data", ACM Geographic Information Systems Workshop on Location Based Social Networks (ACM LBSN 2009), Seattle, Washington, Nov. 3, 2009, pp. 17-20, retrieved on Apr. 16, 2010 at <<http://delivery.acm.org/10.1145/1630000/1629894/p17-zheng.pdf?key1=1629894&key2=6324041721&coll=GUIDE&dl=GUIDE&CFID=86381688&CFTOKEN=49903381>>.
Zheng et al., "Learning Transportation Mode from Raw GPS Data for Geographic Applications on the Web", ACM Conference on World Wide Web (ACM WWW 2008)), Apr. 21, 2008, pp. 247-256, retrieved on Apr. 16, 2010 at <<http://research.microsoft.com/pubs/78567/fp485-Zheng.pdf>>.
Zheng et al., "Microsoft GeoLife Project, GeoLife: Building social networks using human location history", Microsoft Research, 2009, 4 pages, retrieved on Apr. 16, 2010 at <<http://research.microsoft.com/en-us/projects/geolife/default.aspx>>.
Zheng et al., "Mining Interesting Locations and Travel Sequences from GPS Trajectories", Proceedings of the 18th International Conference on World Wide Web (WWW 2009), Madrid, Spain, Apr. 20-24, 2009, pp. 791-800, retrieved on Apr. 16, 2010 at <<http://research.microsoft.com/pubs/79440/fp120-zheng.pdf>>.
Zheng, et al., Recommending friends and locations based on individual location history. In ACM Transaction on the Web, 2011, 44 pages, <<http://research.microsoft.com/pubs/122435/RecomFriend-zheng-Published.pdf>>.
Zheng et al., "Recommending Friends and Locations Based on Individual Location History", ACM Trans. Asian Language Information Processing, vol. 6, No. 3, Article 9, Ch. 45, Nov. 2007, 47 pages, retrieved on Apr. 16, 2010 at <<http://research.microsoft.com/pubs/122435/Recommending%20friends%20and%20locations%20based%20on%20individual%20location%20history.pdf>>.
Zheng, et al., "Searching Your Life on Web Maps", Microsoft Research, Available at <<http://research.microsoft.com/en-us/people/yuzheng/searching_your_life_over_web_maps.pdf>>, 2008, 4 pgs.
Zheng, et al., T-Drive: Driving Directions based on Taxi Trajectories, In Proc. ACM SIGSPATIAL GIS 2010. ACM Press , 2010, 10 pages, <<http://www.cse.unt.edu/~huangyan/6350/paperList/T-Drive.pdf>>.
Zheng, Li, Chen, Xie, Ma, "Understanding Mobility Based on GPS Data", retrieved on Dec. 29, 2009 at <<http://delivery.acm.org/10.1145/1410000/1409677/p312-zheng.pdf?key1=1409677&key2=0364712621&coll=GUIDE&dl=GUIDE&CFID=70433597&CFTOKEN=93582958, ACM Proceedings of Conference on Ubiquitous Computing (UbiComp), vol. 344, Sep. 21, 2008, pp. 312-321.
Ziebart, et al., Navigate like a cabbie: Probabilistic reasoning from observed context-aware behavior. In Proc. Ubicomp 2008, pp. 322-331, <<http://citeseerx.ist.psu.edu/viewdoc/download?doi=10.1.1.141.7187&rep=rep1&type=pdf>>.
Ge et al., "An Energy-Efficient Mobile Recommender System", KDD 2010, 9 pages.
Office action for U.S. Appl. No. 12/712,857, mailed on Aug. 5, 2013, Zheng, et al., "Map-Matching for Low Sampling-Rate GPS Trajectories", 15 pages.
Office action for U.S. Appl. No. 12/794,538, mailed on Sep. 13, 2013, Zheng, et al., "Searching Similar Trajectories by Locations", 12 pages.
Office action for U.S. Appl. No. 12/041,608, mailed on Nov. 22, 2013, Josefsberg, et al., "Client-Side Management of Domain Name Information", 7 pages.
Office action for U.S. Appl. No. 12/794,538, mailed on Nov. 25, 2013, Zheng, et al., "Searching Similar Trajectories by Locations", 18 pages.
Office action for U.S. Appl. No. 13/324,758, mailed on Jul. 11, 2013, Zheng et al., "Urban Computing of Route Oriented Vehicles", 47 pages.
Office action for U.S. Appl. No. 12/712,857, mailed on Feb. 21, 2014, Zheng, et al., "Map-Matching for Low Sampling-Rate GPS Trajectories", 15 pages.
Office action for U.S. Appl. No. 12/353,940, mailed on Mar. 4, 2014, Zheng, et al., "Detecting Spatial Outliers in a Location Entity Dataset", 10 pages.
Office action for U.S. Appl. No. 12/567,667, mailed on Feb. 25, 2014, Zheng et al., "Recommending Points of Interests in a Region", 31 pages.
Ashbrook, et al., "Using GPS to Learn Significant Locations and Predict Movement Across Multiple Users", Journal of Personal and Ubiquitous Computer Archive, vol. 7, Issue 5, Oct. 2003, 15 pages.
Breiman, "Bagging Pedictors", Machine Learning, vol. 24, No. 2, Aug. 1996, pp. 123-140.
Chen, et al., "GeoTracker Geospatial and Temporal RSS Navigation", WWW2007, May 2007, pp. 41-50.
"CRF++: Yet Another CRF Toolkit", retrieved on Jan. 18, 2008 from <<http://crfpp.sourceforge.net>>, 13 pages.
Hadjieleftheriou, et al., "Complex Spatio-Temporal Pattern Queries", Proceedings of the 31st VLDB Conference, Sep. 2005, pp. 877-888.
Hadjieleftheriou, et al., "Efficient Indexing of Spatiotemporal Objects", Proceedings of the 8th International Conference on Extending Database Technology: Advances in Database Technology, Mar. 2002, 10 pages.
Han, et al., "Predicting User' Movement with a Combination of Self-Organizing Map and Markov Model", ICANN 2006, Part II, LNCS 4132, Sep. 2006, pp. 884-893.
International Preliminary Report on Patentability cited in PCT Application No. PCT/US2009/032777 dated Sep. 10, 2010, 6 pages.
Ishi, et al., "Head Motion During Dialogue Speech and Nod Timiong Control in Humanoid Robots", 5th ACM/IEEE International Conference on Human-Robot Interaction (HRI'10), Mar. 2010, pp. 293-300.
International Search Report and Written Opinion Received for PCT Application No. PCT/US2009/0327777, mailed Aug. 26, 2009, 10 pages.
International Search Report dated Aug. 19, 2009 for PCT Application No. PCT/US2009,032778, filed Jan. 31, 2009, 11 pages.
Lafferty, et al., "Conditional Random Fields: Probabilistic Models for Segmenting and Labeling Sequence Data", Proceedings of the 18th International Conference on Machine Learning, Jun. 2001, 8 pages.
Mitchell, et al., "Six in the City: Introducing Real Tournament—A Mobile IPv6 Based Context-Aware Multiplayer Game", NetGames'03, May 2003, pp. 91-100.
"North York Moors and Yorkshire Wolds Mountain Bke (MTB) Routes", retrieved on Jan. 17, 2008 from http://www.mtb-routs.co.uk/northyorkmorrs/defaultaspx, 4 pages.
Non-Final Office Action for U.S. Appl. No. 12/041,608, mailed on Jun. 25, 2014, Josefsberg, et al., "Client-Side Management of Domain Name Information", 4 pages.
"SlamXR List Routes Page By Microsoft Research Community Technologies Group", retrieved on Jan. 18, 2008 from http://www.msslam.com/slamxr/ListRoutes.aspx>, 2 pages.
"SportsDo", retrieved on Jan. 17, 2008 from http://sportsdo.net/Activity/ActivityBlog.aspx, 3 pages.
Strachan, et al., "gpsTunes Controlling Navigation via Audio Feedback", Proceedings of MobileHCI, Sep. 2005, 4 pages.
Sui, "Decision Support Systems Based on Knowledge Management", Proceedings of the International Conference on Services Systems and Services Management (ICSSSM'05), Jun. 2005, vol. 2, pp. 1153-1156.
Tezuka, et al., "Toward Tighter Integration of Web Search with a Geographic Information System", WWW2006, May 2006, 10 pages.
Theodoridis, et al., "Spatio-Temporal Indexing for Large Multimedia Applications", Proceedings of the IEEE International Conference on Multimedia Systems, Jun. 1996, 9 pages.

(56) References Cited

OTHER PUBLICATIONS

Theodoridis, et al., "Specifications for Efficient Indexing in Spatiotemporal Databases", Proceedings of the Sddbm'98, Jul. 1998, 10 pages.

Toyama, et al., "Geographic Location Tags on Digital Images", MM'03, Nov. 2003, 11 pages.

"Twittervision", retrieved on Jan. 18, 2008 from http://twittervision.com, 1 page.

Wasinger, et al., "M3I in a Pedestian Navigation & Exploration System", Proceedings of the Fifth International Symposium on Human Computer Interaction with Mobile Devices, Sep. 2003, 5 pages.

Wei, et al., "A Service-Portlet Based Visual Paradigm for Personalized Convergence of Information Resources", 2nd IEEE International Conference on Computer Science and Information Technology, Aug. 2009, pp. 119-124.

"Weka 3: Data Mining Software in Java", retreived on Jan. 18, 2008 from http://www.cs.waikato.ac.nz/ml/weka/index_home.html, 1 page.

"Welcome to WalkJogRun", retreived on Jan. 17, 2008 from http://www.walkjogrun.net, 1 page.

"WikiWalki Community Trail Guide", retrieved on Jan. 17, 2008 from http://www.wikiwalki.com, 1 page.

Zhang, et al., "Research on Information Fusion on Evaluation of Driver Fatigue", 2008 International Symposium on Computer Scientc and Computational Technology, Dec. 2008, pp. 151-155.

Office Action for U.S. Appl. No. 12/353,940, mailed on Jul. 17, 2014, Yu Zheng, "Detecting Spatial Outliers in a Location Entity Dataset", 10 pages.

Final Office Action for U.S. Appl. No. 12/567,667, mailed on Aug. 27, 2014, Yu Zheng, "Recommending Points of Interests in a Region", 7 pages.

Office action for U.S. Appl. No. 12/712,857, mailed on Jan. 6, 2015, Zheng, et al., "Map-Matching for LowSampling-Rate GPS Trajectories", 15 pages.

Office Action for U.S. Appl. No. 13/324,758, mailed on Dec. 24, 2014, Zheng et al., "Urban Computing of Route-Oriented Vehicles", 54 pages.

\* cited by examiner

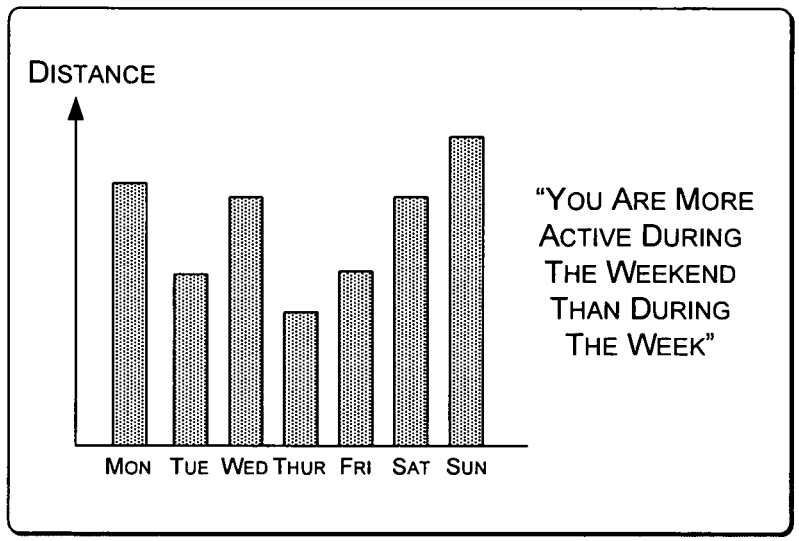
MEAN DISTANCE OF OUTDOOR MOVEMENT
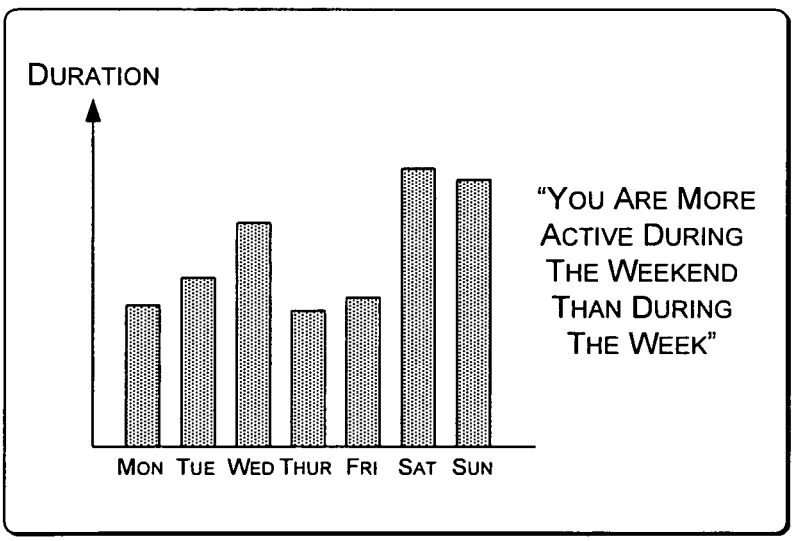
MEAN DURATION OF OUTDOOR MOVEMENT
FIG. 6

SYSTEM FOR LOGGING LIFE EXPERIENCES USING GEOGRAPHIC CUES

RELATED APPLICATIONS

This patent application is related to U.S. Pat. No. 8,078,394 to Wang et al., entitled, "A Flexible Spatio-Temporal Indexing Scheme for Large-Scale GPS Track Retrieval," filed concurrently herewith, and incorporated herein by reference; and to U.S. Pat. No. 8,015,144 to Zheng et al., entitled, "Learning Transportation Mode from Raw GPS Data," filed concurrently herewith, and incorporated herein by reference.

BACKGROUND

With decreasing prices and increasing accuracy in pinpointing locations, Global Positioning System (GPS) devices such as GPS phones have become prevalent. As never before, voluminous GPS log data are accumulated continuously and unobtrusively. These large volumes of GPS data have given rise to a generation of conventional applications on the Internet ("the web"). Such applications allow users to upload, share, and browse GPS track logs. So far, however, GPS data have been utilized directly in relatively raw form without conventional applications providing much insight into the full potential GPS data can provide for tracking a person's experiences. Moreover, existing search methods that use tags, such as activity tags and region tags, do not generally satisfy users' needs to put the GPS data to full personal use.

Managing and understanding the collected GPS data are two important issues that could increase the value of the GPS data and the applications that use them. On one hand, indexing the ever-increasing GPS data could enable effective retrieval for users trying to find GPS data of interest. By understanding a user's GPS data, an application is more likely to provide novel services that will stimulate users to passionately contribute their GPS data. Thus far, however, GPS data are conventionally used in relatively raw form without much understanding of their full potential.

SUMMARY

This disclosure describes a system for logging life experiences using geographic cues. The system variously provides a comprehensive life-logging tool for recording each life event; a vacation album for revisiting and reliving vacation routes and associated photos; an information service for finding popular routes and locations; a statistical tool for analyzing metrics of a person's life; and a personal website service for sharing personal information. In one implementation, the system receives a user's GPS log files and multimedia content at a website. The system segments the GPS log files into geographic routes corresponding to user trips, and tags the multimedia content with geographic cues from the GPS log files. Then, the system indexes the geographic routes so that users can retrieve the geographic routes by browsing or by search techniques. The system displays animations of selected routes on a map, and displays the multimedia content at corresponding locations along the map route, as the route is replayed. The system also provides browsing and spatial and temporal techniques to search a person's travels and can provide graphical displays of the person's activity statistics.

This summary is provided to introduce the subject matter of a system for logging life experiences using geographic cues, which is further described below in the Detailed Description. This summary is not intended to identify essential features of the claimed subject matter, nor is it intended for use in determining the scope of the claimed subject matter.

BRIEF DESCRIPTION OF THE DRAWINGS

FIG. 6 is a diagram of exemplary statistical activity information derived from a user's GPS log files.

DETAILED DESCRIPTION

Overview

Figure 1:
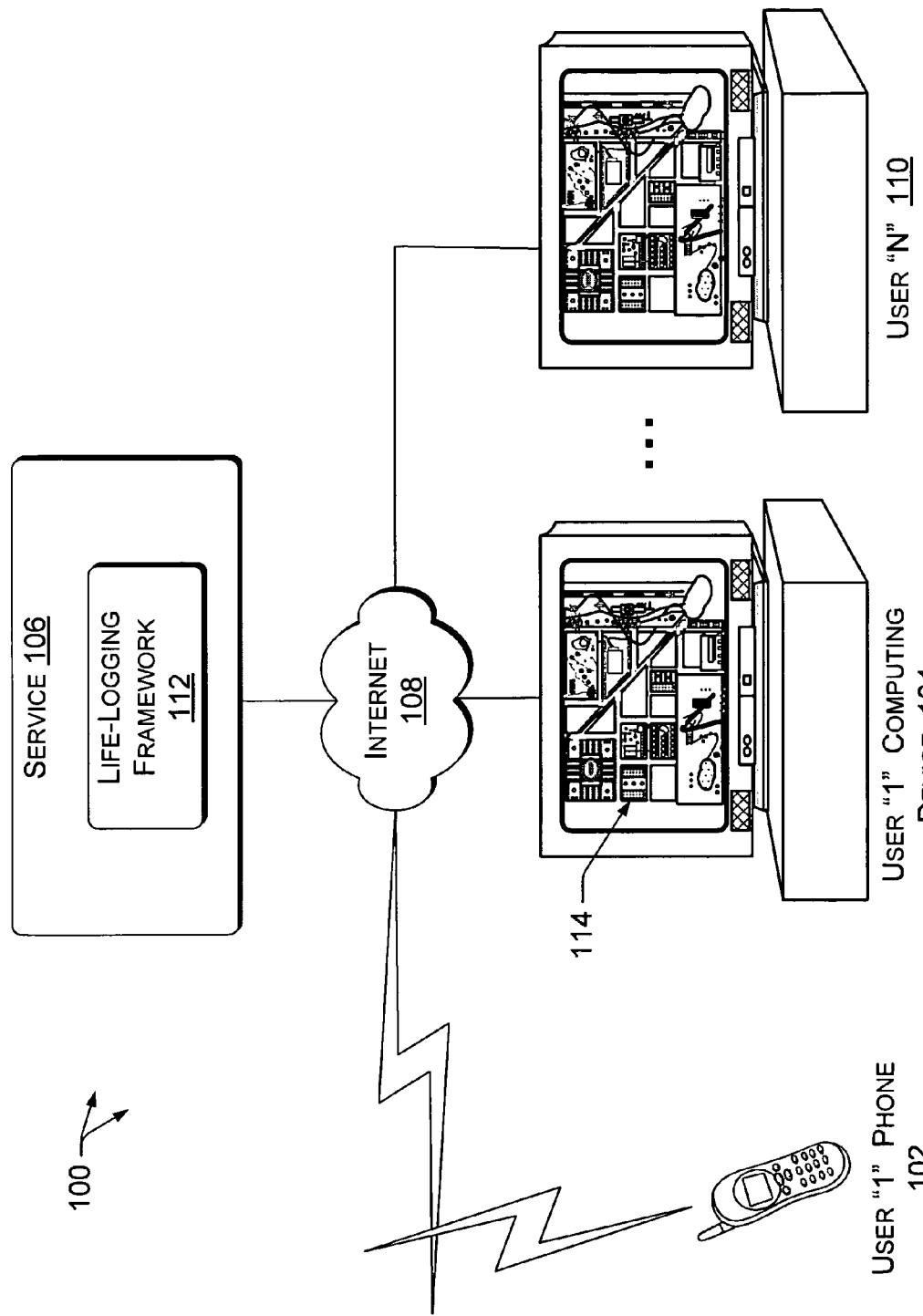
FIG. 1 is a diagram of an exemplary system for logging life experiences using geographic cues.

This disclosure describes systems and methods for logging life experiences using geographic cues. An exemplary system provides effective visualization, organization, effective mining, and fast retrieval of GPS log data for both personal and public use. The system not only provides a powerful platform for enabling users to effectively manage their personal GPS data but also helps users access and understand other users' experiences via exemplary processing of raw GPS data.

In one implementation, an exemplary system provides a website at which users may upload their GPS logs and associated multimedia content, such as digital photographs, videos, and audio clips, etc. The system determines specific GPS "trip" or "journey" tracks from the GPS data, and tags the multimedia content with corresponding GPS location coordinates, indexing GPS trajectories uploaded by users based at least in part on user behavior in uploading GPS data. The terms GPS track, GPS trajectory, trip, route, and journey are used somewhat interchangeably herein.

In a database for each user, the system processes the GPS data and related multimedia content into a spatial-temporal index. Users can voluntarily enable public access of their personal GPS and multimedia data, which is processed into a public database of useful, favorite places and travel routes.

An exemplary user interface (UI) visualizes the GPS data over digital maps and displays associated past events actively via the multimedia content, e.g., as an animation. In one implementation, the system includes a calendar-based browsing method and search methods to navigate the user's GPS log data and corresponding multimedia data. By browsing, users can view a day's worth of data over maps by clicking the date in a calendar. By searching, users can retrieve the data over a longer term by selecting a spatial area of the map and/or by selecting a time interval as the query. A results list of trips with embedded multimedia data are generated by both techniques. Given a results list, users can sort the results according to different features, e.g., the start/end time, average rate of speed, length of a trip, etc. Moreover, when using the search techniques, users can present the search results by day, and then rank them according to the features mentioned above.

By clicking a trip in the results list, users can view the trip's detailed information including the start/end time, length, duration, average rate, number of images photographed along the route, etc. Then users can play the trip in animation. An icon representing the user moves along the selected trip route on the map and actively displays/plays the content of the multimedia data at the places where the videos, photos, audio clips, etc., were acquired. Meanwhile, the exact time and name of each location the user traversed is simultaneously displayed during the process of animation, along with ancillary information, such as the weather at that time, news events that were occurring at the same time, etc.

In one implementation, the system interprets aspects of a GPS trajectory, including inferring its transportation mode, i.e., which segments of the GPS trajectory represent car travel, a bus ride, a train ride, a boat ride, bicycling, walking, running, etc.

In addition, given a GPS track log and associated multimedia data that users have created, the system helps users to visualize their personal events on web maps and to understand their life patterns, for example, to obtain such useful and interesting information as:

statistical information about a user's outdoor movements;
ratios between different transportation modes during a journey or during a time interval;
statistics on the time of day that one leaves a workplace, etc.

Thus, in one implementation, the exemplary system provides a GPS log-driven application over web maps. Given a GPS track log and associated multimedia data acquired by users, the system assists the users to visualize their personal events on web maps and to understand their life patterns. By optionally publishing their GPS tracks and associated multimedia content, users can share their life experiences with others and absorb rich knowledge from others' GPS tracks.

The exemplary system thus has many uses, including: 1) as a comprehensive life-logging tool for recording each life event; 2) as a vacation album for revisiting and reliving vacation routes and associated photos, sounds, and multimedia content; 3) as an information service for finding current popular shopping spots, acquiring entertainment recommendations, avoiding traffic congestion, and finding scenic map routes; 4) as a statistical tool for analyzing metrics of one's own life and forming a self-improvement plan; and 5) as a personal website service for sharing personal information with the public and building a social community, akin to MYSPACE.COM, YOUTUBE.COM, FACEBOOK.COM, etc.

Exemplary System

FIG. 1 shows an exemplary system 100 for logging life experiences using geographic cues. The components and layout of the exemplary system 100 are just one example for the sake of description. Other components and layouts are possible for the exemplary system 100. A user's phone 102 and computing device 104 are communicatively coupled with an exemplary service 106, e.g., via the Internet 108. Numerous other users, such as user "N" 110 are also connected to the exemplary service 106.

The service 106 enables each user 102, 104, 110 to upload GPS data and multimedia files to a life-logging framework 112, which in turn can be accessed and queried by user phones 102 and user computing devices 104, 106. In one implementation, the life-logging framework 112 includes UI's for computing devices 104, such as desktop, notebook, and mobile computers, and for mobile phones 102 and other mobile communication devices. Through the UI's, users may upload GPS and multimedia content, and in turn, download animated GPS trajectories of their own and others' trips, including the multimedia content and other useful information keyed to the particular route that the GPS trajectory depicts over a geographic map 114, for example an aerial or bird's-eye view digital map.

Figure 2:
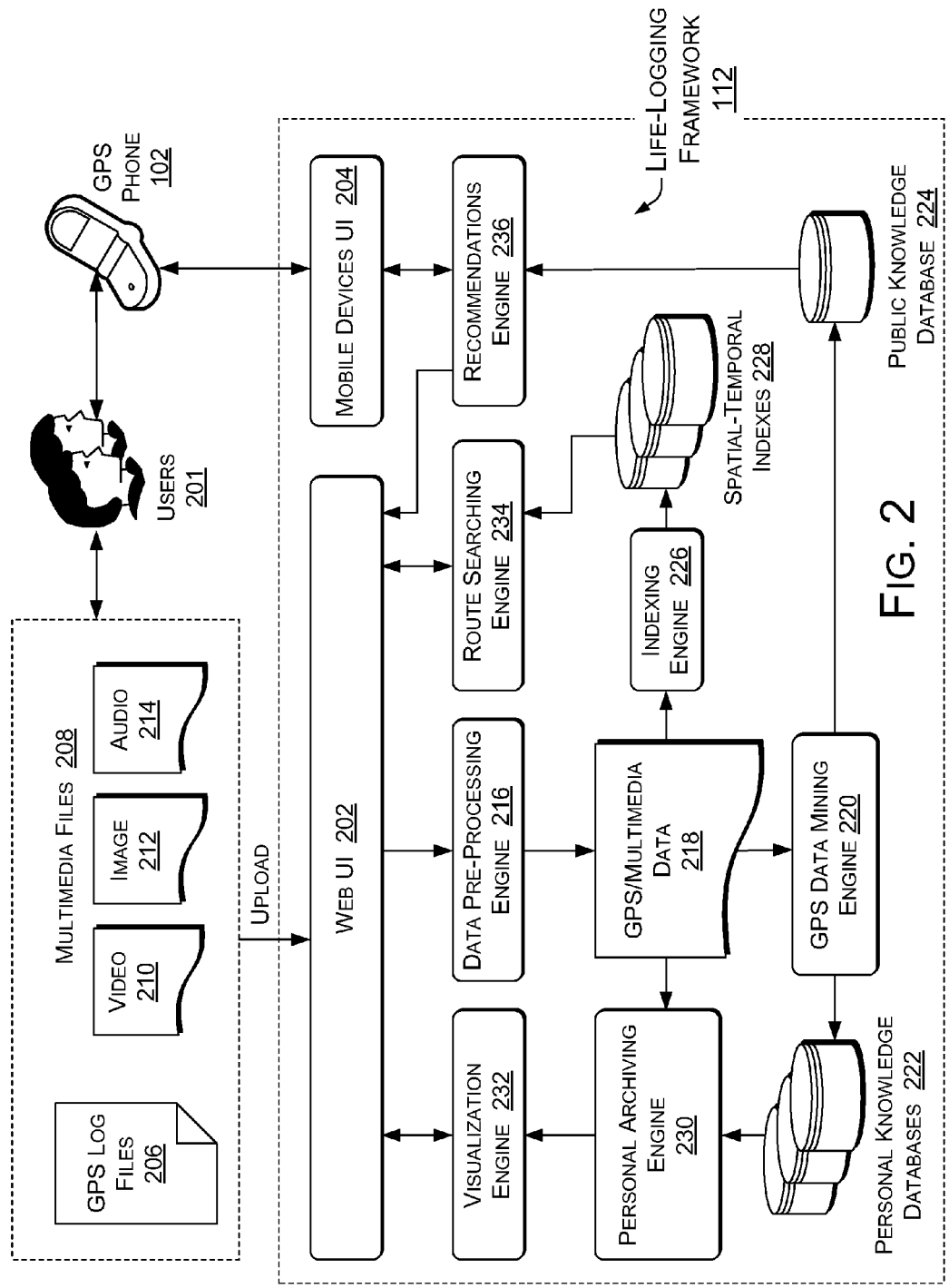
FIG. 2 is a block diagram of an exemplary life-logging framework.

FIG. 2 shows the exemplary life-logging framework 112 of FIG. 1, and associated entities, in greater detail. The components and layout of the exemplary life-logging framework 112 are just one example for the sake of description. Other components and layouts are possible for the exemplary life-logging framework 112. In the illustrated implementation, the life-logging framework 112 includes the web UI 202 and the mobile devices UI 204 introduced above, through which users 201 may upload their GPS log files 206 and their multimedia files 208, such as video clips 210, images 212, and audio clips 214.

The exemplary life-logging framework 112 also includes a data-preprocessing engine 216, for parsing the GPS/multimedia data 218; a GPS data mining engine 220, personal knowledge databases 222, a public knowledge database 224, an indexing engine 226, spatial-temporal indexes 228, a personal archiving engine 230, a visualization engine 232, a route searching engine 234, and a recommendations engine 236.

Operation of the Exemplary Life-Logging Framework

When the user's phone 102 or other mobile communication device is GPS enabled, GPS data 206 from the phone 102 can be uploaded to the service 106, e.g., either directly or via a download of the GPS data 206 to the user's computing device 104, and in turn from the computing device 104 to the service 106. The user 201 may also upload multimedia files 208 to the service 106 via either the web UI 202 or the mobile devices UI 204.

After users 201 upload their GPS log data 206 with corresponding multimedia data 208 to the service 106, the system segments the GPS log data 206 into several trips if the time interval between two consecutive GPS points exceeds a time threshold. Then the pre-processing engine 216 projects the multimedia data 208 to their associated corresponding geographic locations. Meanwhile, the indexing engine 226 builds a spatial and temporal index 228 for the user 201 over the GPS data 206 so that the user 201 can organize their data more effectively and efficiently.

In general, the GPS data mining engine 220 and the indexing engine 226 of the life-logging framework 112 mine, index, and/or cross-correlate the GPS data 206 and the uploaded multimedia content 208 to create an indexed spatial-temporal index 228. In turn, a personal knowledge database 222 of GPS trajectories is created as well as related multimedia content 208 for the user 201. A public knowledge database 224 of GPS trajectories, related multimedia content 208, and other useful information can be created for other users of the service 106.

After the data pre-processing engine 216 parses the received files 206, 208, it tags each multimedia file 208 with the corresponding GPS coordinates, e.g., of the geographic location where the multimedia files 208 were acquired, so that the tagged GPS/multimedia data 218 are ready for creative and effective browsing by users 201. In one implementation, based on user behavior of uploading their GPS trajectories, the indexing engine 226 builds a spatial-temporal index 228 for the user 201 over the parsed GPS data 218 for rapidly retrieving GPS tracks over maps 114. That is, presented with a search query consisting of a spatial range selected over a map 114 and/or presented with a temporal interval of interest, the route searching engine 234 retrieves all GPS tracks across the spatial range and/or temporal interval. Such searches are further described in relation to FIGS. 4 and 5.

For personal use, the personal archiving engine 230 assists each user 201 to archive his/her own historical data 222 from which the GPS data mining engine 220 can mine many types of information, such as personal transportation routes and routines, significant places, life patterns, etc. These types of information are processed by the visualization engine 232, which drives and animates the web UI 202, and the mobile devices UI 204. The personal knowledge 222 is further leveraged to help users summarize their own experiences and preferences, for example travel and sports events, and thereby acquire healthy habits for daily life. From the public data 224, the route searching engine 234 and the recommendations engine 236 can learn classic sports routes, popular travel routes, popular places, and traffic conditions of various different routes at different times. The recommendations engine 236 presents the mined knowledge 224 to users 201 via the Web UI 202 or the mobile devices UI 204 when users 201 need suggestions.

In one implementation, the route searching engine 234 employs a spatio-temporal search function powered by a flexible indexing scheme based on user behavior of uploading GPS tracks 302. For example, users 201 are more likely to upload GPS data 206 of the recent past than of the distant past. Hence, in one implementation, the life-logging framework 112 leverages a B+tree to index frequently updated groups and utilizes a sorted dynamic array for rarely updated groups. Once the update frequency of a group drops below a threshold, the indexing engine 226 may convert the particular index from a B+tree format to a sorted dynamic array format. The skewed nature of accumulated GPS tracks 302 is taken into account, so that compared with conventional spatio-temporal indexing techniques, the exemplary spatial-temporal indexes 228 require less index space and less update cost while keeping satisfactory retrieval performance. The exemplary indexing techniques are described in detail in the above-cited U.S. Pat. No. 8,078,394 to Wang et al., entitled, "A Flexible Spatio-Temporal Indexing Scheme for Large-Scale GPS Track Retrieval," which is incorporated herein by reference.

In one implementation, the exemplary life-logging framework 112 employs supervised learning to automatically learn the transportation modes of a given GPS track 302, including walking, taking a bus, riding a bike, driving a car, etc., from the raw GPS data 206. When a GPS log file 206 is uploaded, the data pre-processing engine 216 divides the GPS track 302 into trips and then partitions each trip into segments. Then, features from each segment are extracted and sent to an inference model. Two different inference models are considered when learning a user's transportation mode. In one model, the segments of GPS tracks 302 are regarded as independent instances and handled as a normal classification problem with general classifiers. After the inference, post-processing is performed to improve the prediction accuracy by taking the transition probability between different transportation modes into account. In the other inference model, a conditional random field (CRF) technique is leveraged to perform the inference. Since the conditional probabilities between different transportation modes are considered in the CRF's graphical model, post-processing is not performed with this model.

Advantages of the exemplary automatic techniques for learning transportation modes of a user 201 from raw GPS data 206 are: 1) the exemplary techniques can infer compound trips, which include more than one kind of transportation mode; 2) the exemplary techniques are independent of other information from maps and other sensors; and 3) the transportation mode inference model learned from the data set of some 201 can be applied to infer GPS data of other users. Automatically learning the transportation modes of a user 201 from raw GPS data 206 and forming transportation mode inference models is further described in the above-cited U.S. Pat. No. 8,015,144 to Zheng et al., entitled, "Learning Transportation Mode from Raw GPS Data," which is incorporated herein by reference. Once the segments of a GPS track 302 are associated with various transportation modes, the web UI 202 or the mobile devices UI 204 can display an icon of the current transportation mode (car icon, train icon, etc.) as the user 201 traverses the GPS track 302 that is on display.

Exemplary User Interfaces

Figure 3:
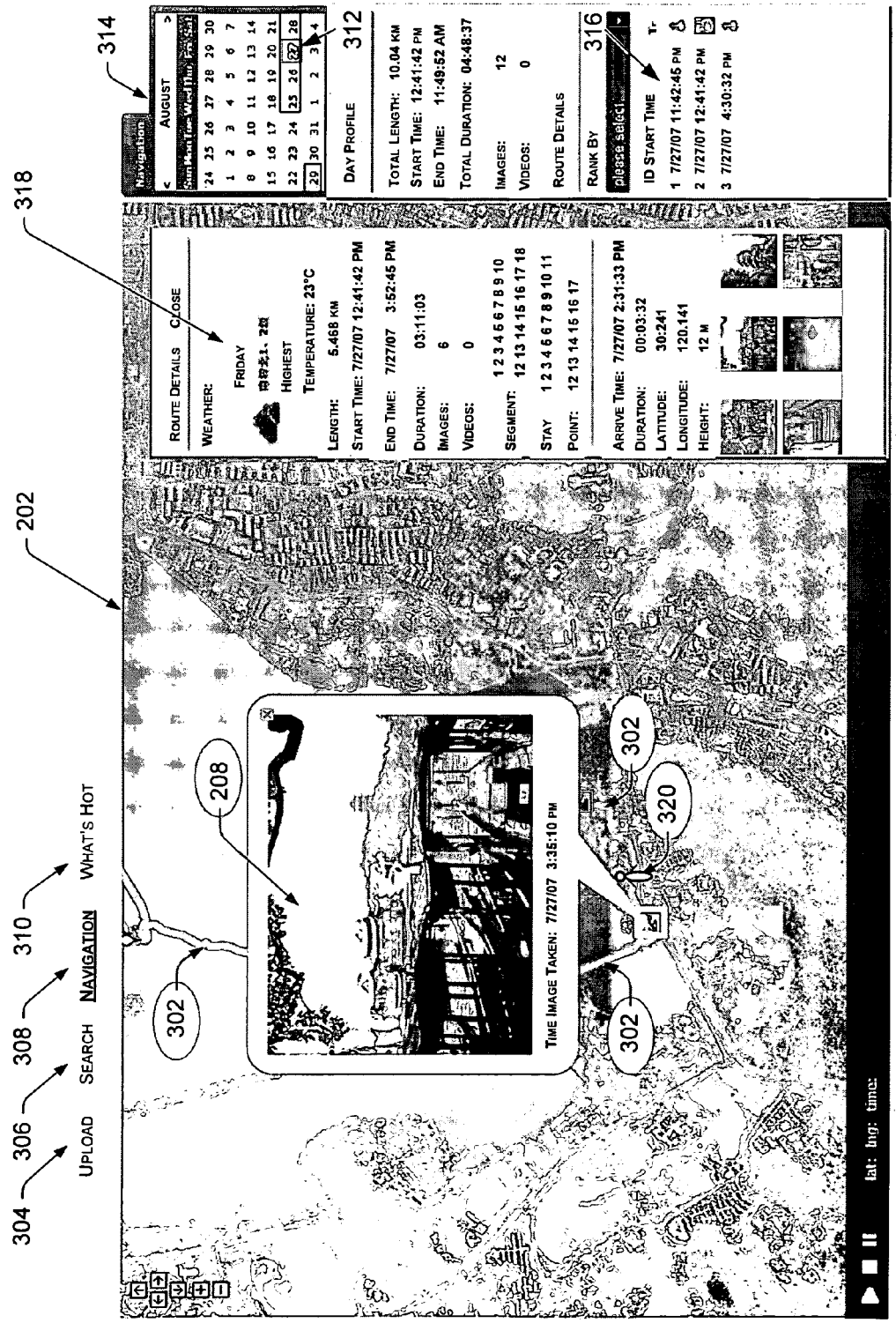
FIG. 3 is a screen shot of an exemplary web user interface of a life-logging framework.

FIG. 3 shows an exemplary web UI 202. Compared to conventional text-based techniques for presenting GPS data, the exemplary web UI 202 provides a more creative, concise, and explicit approach for expressing user experiences. Hence, users 201 can more accurately and colorfully connect to their personal trips and past events, and also obtain more information from other people's experience when they browse a GPS track 302. The exemplary web UI 202 includes various options, including an upload option 304 for uploading GPS log files 206 and multimedia content 208, a search option 306 for specifying a spatial and/or temporal search query, a navigation option 308 for browsing for past trips via calendar based browsing or map-based browsing, and a "what's hot" option 310 for accessing the recommendations engine 236 in order to find a popular or suggested travel route, commercial establishment, or popular location.

When the navigation option 308 of the exemplary web UI 202 is selected, a calendar-based browsing technique enables navigating the user's GPS tracks 302 and corresponding multimedia data 208, i.e., from the personal knowledge database 222 and the spatial-temporal indexes 228. In navigation (or browsing) mode, the user 201 can view their data one day at a time over maps by clicking a date 312 in the calendar 314. A results list 316 of trips is generated and displayed, each trip including embedded multimedia data 208 that is activated for display when an icon 320 representing the user 201 arrives at the place in the displayed route that is associated with the particular multimedia content.

Given the results list 316, users 201 can sort the trips according to different features, e.g., the start/end time, average rate, or the length of a trip. Then, by clicking a trip in the results list 316, users 201 can view the trip's detailed information 318 including the start/end time, length, duration, average rate, number of images taken along the trip's route, etc. Then the user 201 can play the trip in animation. An icon 320 representing the user 201 moves along the selected trip route 302 and shows the content of multimedia data 208 at each place where a respective multimedia content 208 was acquired. The exact time and name of each location along the route 302 can also be simultaneously displayed during the animation.

Figure 4:
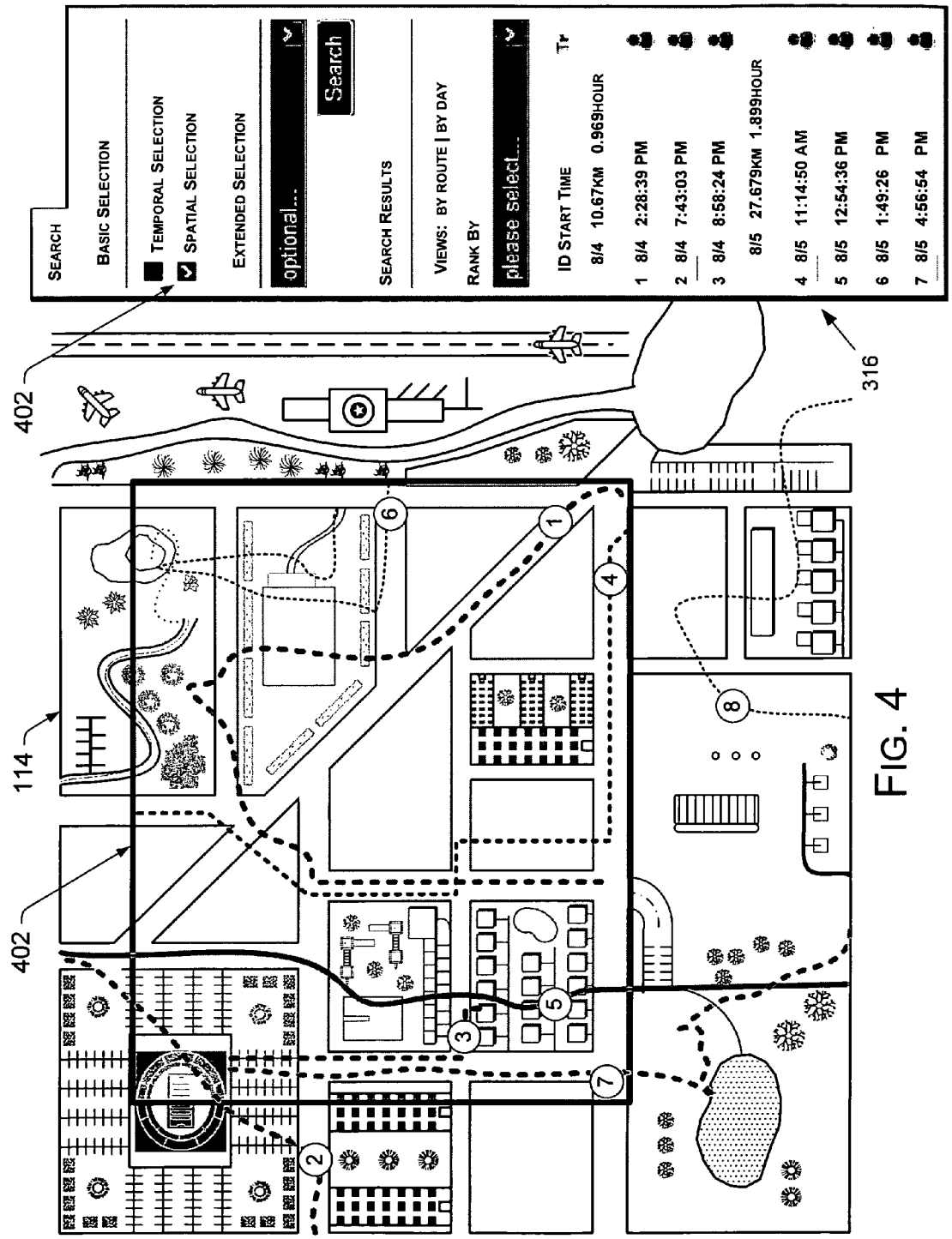
FIG. 4 is a diagram of an exemplary spatial search user interface.

FIG. 4 shows a search option 306 of the exemplary web UI 202. In one implementation, a user 201 may search for (past or public) GPS tracks 302 by spatial area 402, by time period, or by both of these criteria at once in a spatial-temporal Boolean combination.

Like the browse/navigation option 308 described above with respect to FIG. 3, the spatial search option 306 of FIG. 4 generates a results list 316 of trips that is displayed in list form (316) and/or as visualized routes, e.g., routes 1-7, on the displayed map 114. The user 201 can arbitrarily scale the range of the selected spatial area 402 over the map 114. As shown in FIG. 4, the route searching engine 234 will retrieve the GPS tracks not only within the selected spatial area 402 but also those GPS tracks intersecting but not lying fully inside the spatial area 402. For example, in FIG. 4, GPS tracks 1, 3, 4, and 6 are retrieved for the results list 316 by the search function because they are fully contained by the selected spatial area 402; GPS tracks 2, 5, and 7 are also retrieved for the results list 316 by the search function because they intersect the selected spatial area 402 even though these GPS tracks are not fully contained by the selected spatial area 402. GPS track 8, on the other hand, is not captured for the results list 316 because track 8 is not contained by the selected spatial area 402 and does not intersect the selected spatial area 402.

Each trip includes embedded multimedia data 208 that is activated for display when an icon 320 representing the user 201 arrives at the place in the displayed route that is associated with the particular multimedia content. In the search options 306, the user 201 can increase the number of GPS tracks 302 to be returned in the results list 316 by increasing the spatial area selected over the map 114 and/or by selecting a larger time interval for the query. Moreover, when using the search options 306, the user 201 can present the search results by day, and then rank or sort these results according to features mentioned above: i.e., the start/end time, average rate, length of a trip, etc.

Figure 5:
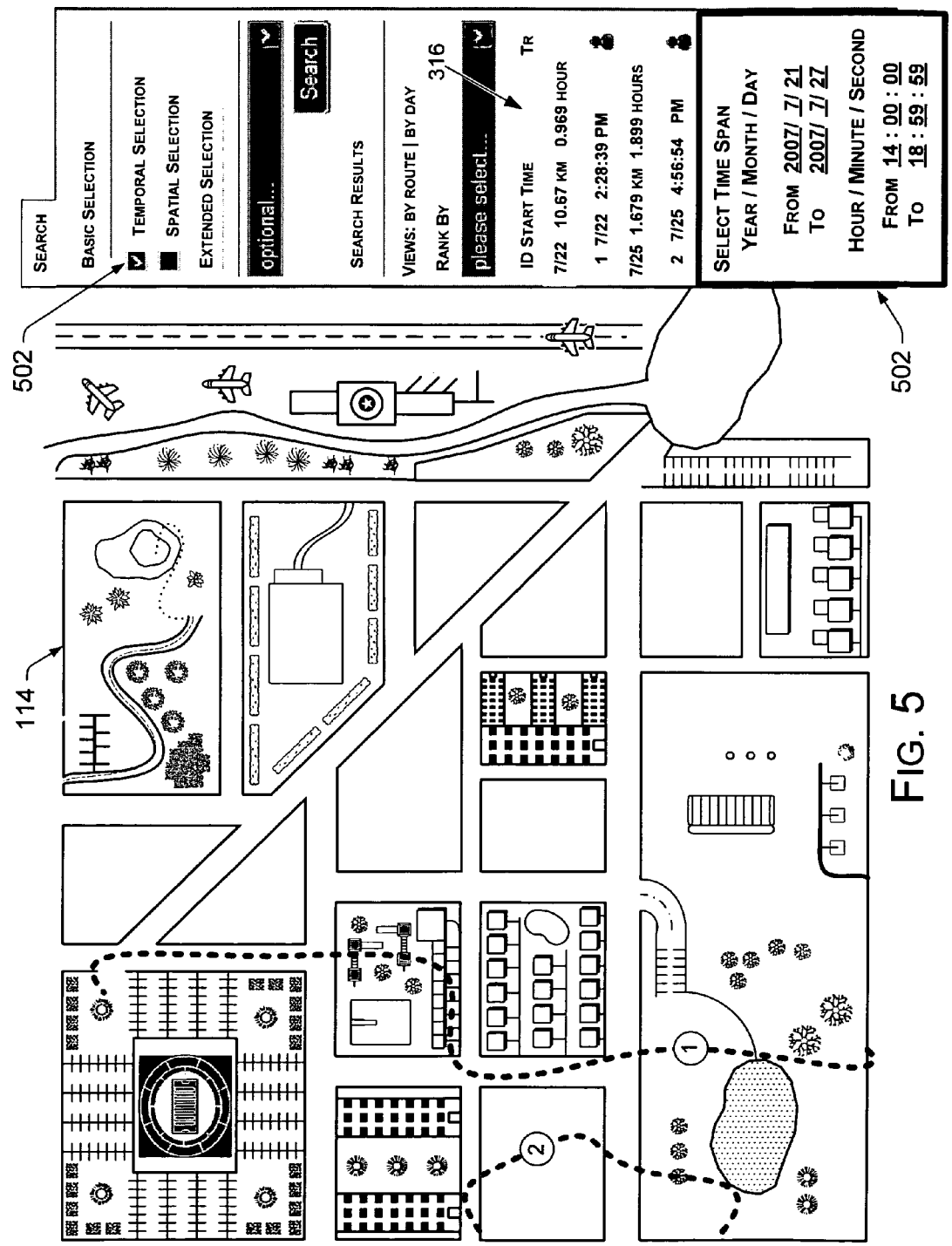
FIG. 5 is a diagram of an exemplary temporal search user interface

FIG. 5 shows a temporal search option 502 of the exemplary web UI 202. In one implementation, the user 201 may search for GPS tracks 302 by time interval. Any GPS tracks during the designated time interval, such as the illustrated tracks 1 and 2, are displayed in a results list 316 and/or as routes visualized on the map 114. Each route includes embedded multimedia data 208 that is activated for display when an icon 320 representing the user 201 arrives at the place in the displayed route that is associated with the particular multimedia content. When using the temporal search options 502, the user 201 can present the search results by day, and then rank or sort these results according to features mentioned above: i.e., the start/end time, average rate, length of a trip, etc.

FIG. 6 shows exemplary visualizations of information from the personal knowledge database 222. As a user 201 logs life events using GPS geographic cues via the life-logging framework 112, the visualization engine 232 can produce graphic compilations of useful data to display on the web UI 202 to help the user 201 visualize his/her life. In FIG. 6, the visualization engine 232 shows mean distance of outdoor movement across days of the week, and mean duration of outdoor movement across days of the week. In one implementation, the life-logging framework 112 includes logic and/or a statistics engine to draw suggestive conclusion to display with the compilations of life event data. Thus, in FIG. 6, both the graph of the mean distance of outdoor movement across days of the week and the mean duration of outdoor movement across days of the week suggest that the user 201 is more active on the weekends than during the work-week, and may suggest an activity norm for comparison drawn from the public knowledge database 224.

Figure 7:
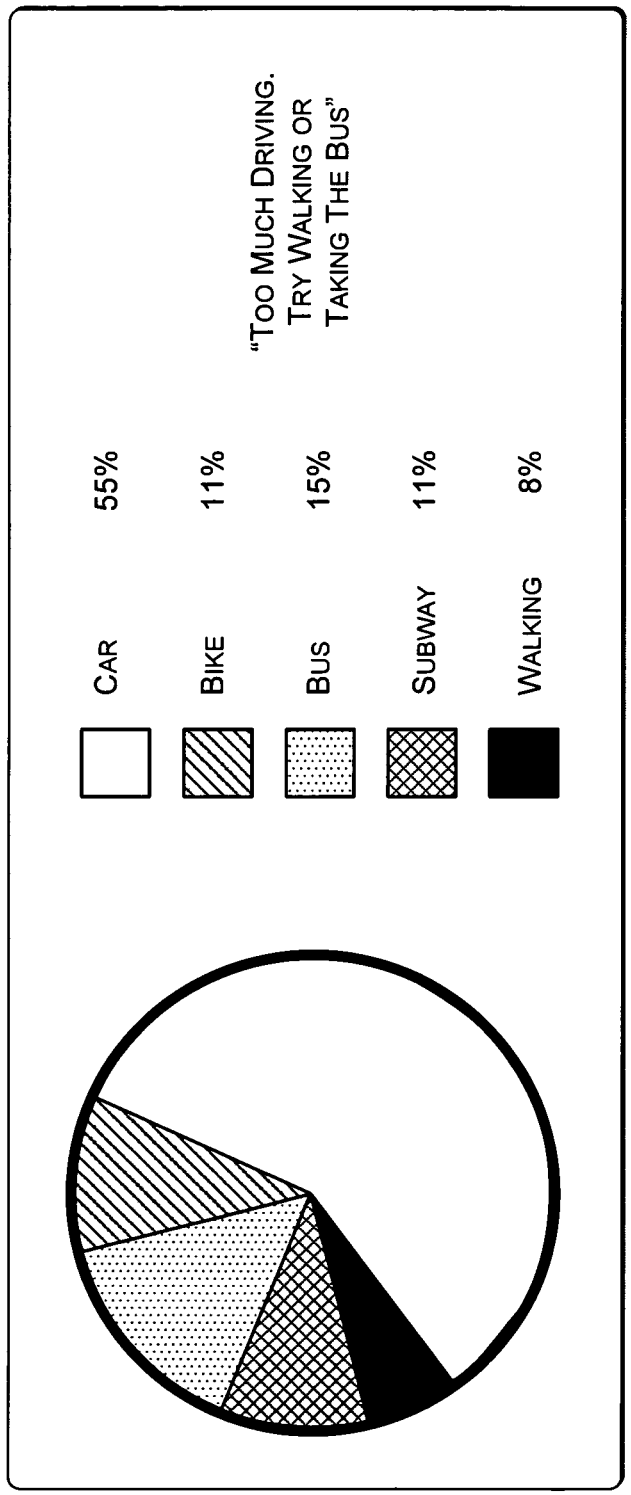
FIG. 7 is a diagram of an exemplary ratio of a user's transportation modes derived from the user's GPS log files.

FIG. 7 shows another exemplary visualization of information from the personal knowledge database 222. As the user 201 logs life events using GPS geographic cues via the life-logging framework 112, the visualization engine 232 may produce a graphic compilation showing a ratio of transportation modes used over an interval of time. The life-logging framework 112 may include logic and/or a statistics engine to draw a suggestive conclusion, for example, that the user 201 should consider driving their car less and walking more for health or taking the bus to help the environment.

Figure 8:
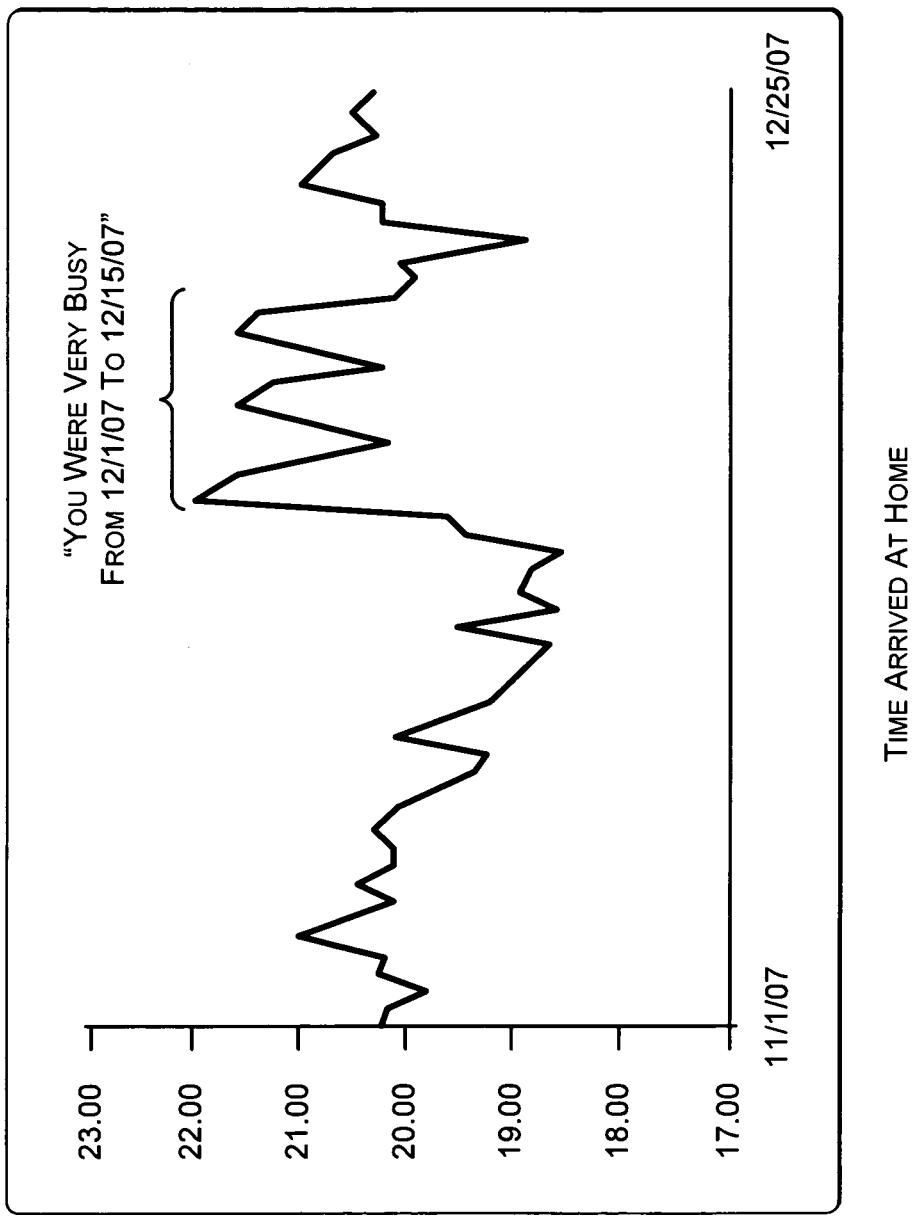
FIG. 8 is a diagram of exemplary statistical arrival and departure patterns derived from the user's GPS log files.

FIG. 8 shows another exemplary visualization of information from the personal knowledge database 222. As the user 201 logs life events using GPS geographic cues via the life-logging framework 112, the visualization engine 232 may produce a graphic compilation showing a graph of the time of day that the user 201, for example, arrives home from work or school (or leaves work or school). The life-logging framework 112 may include logic and/or a statistics engine to draw a suggestive conclusion that the user 201 arrives home later than usual during a certain time of the year, e.g., in a December pre-holiday period, and should consider maintaining a life balance, including maintaining enough sleep, during such times.

Exemplary Methods

Figure 9:
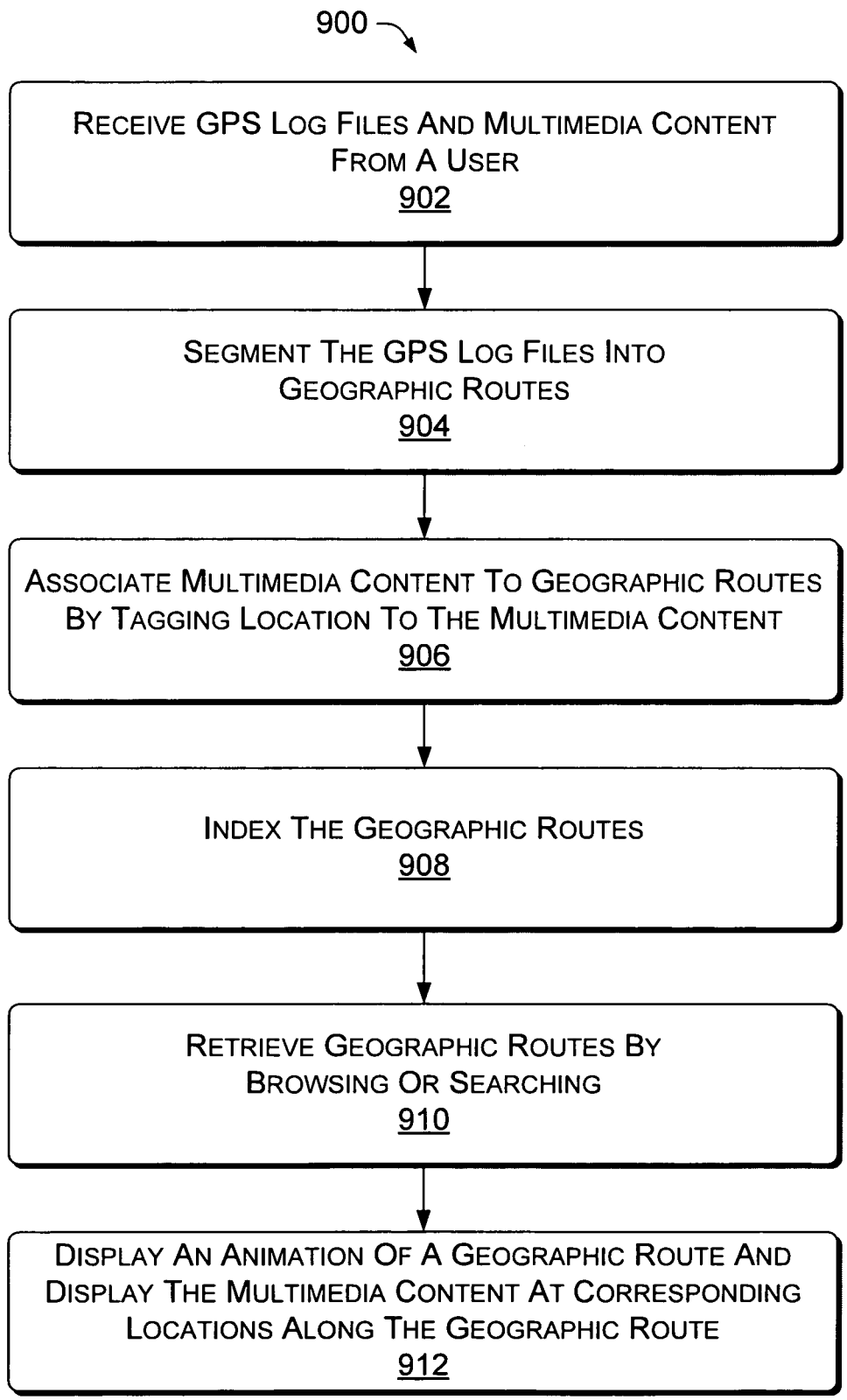
FIG. 9 is a flow diagram of an exemplary method of logging life experiences using geographic cues.

FIG. 9 shows an exemplary method 900 of logging life experiences using geographic cues. In the flow diagram, the operations are summarized in individual blocks. The exemplary method 900 may be performed by combinations of hardware, software, firmware, etc., for example, by components of the exemplary life-logging framework 112.

At block 902, GPS log files and multimedia content are received from a user. In one implementation, the GPS files and multimedia content are received at a service via a website. The user can upload GPS information and multimedia content, such as digital images, videos, and audio clips, via computer or mobile communication device, such as a cell phone.

At block 904, the GPS log files are segmented into geographic routes. Various schemes and algorithms can be employed to partition GPS log files into separate geographic routes, or trips. For example, a marked break in geographic continuity between two temporally successive GPS points might suggest the end of one route and the beginning of another—as when the user turns off the GPS aware device between locations. Sometimes a logical circumstance can be imposed on otherwise contiguous GPS locations to delineate separate GPS tracks. For example, sometimes the method 900 can be programmed to break a geographic route into two routes at a logical transition, e.g., when the user transitions from land-based travel and boards an ocean-going ship. In general, geographic routes can be distinguished from each other by passage of a certain time interval that surpasses a threshold between GPS points.

At block 906, the multimedia contents are associated with geographic routes by tagging locations to each piece of multimedia content. After the data pre-processing and parsing the received files, each multimedia file is tagged with corresponding GPS coordinates, e.g., of the geographic location where the multimedia files were acquired, or to which they are otherwise associated, so that the tagged GPS/multimedia data are ready for creative and effective browsing or searching.

At block 908, the geographic routes are indexed. Based on user's uploading of their GPS data, the technique builds a spatial-temporal index for the user over the parsed GPS data for rapidly retrieving GPS tracks over maps.

At block 910, the geographic routes are retrieved by browsing or searching. The user can browse, e.g., by calendar day, or submit a search query consisting of a spatial range selected over a map and/or a temporal interval of interest. The technique retrieves all GPS tracks across the spatial range and/or temporal interval. Alternatively, the user performs an image/multimedia search or otherwise finds a stored piece of multimedia content. Finding the multimedia content then returns any GPS track(s) associated with the multimedia content.

At block 912, an animation of a geographic route is displayed along with the multimedia content at corresponding locations along the geographic route. That is, the user can play/relive the route or trip forward and backwards over the map. An icon represents the user and/or the icon represents the current mode of transportation for a given segment of a journey.

When a piece of multimedia content has been linked to a location or a time along the route, then at that part of the GPS track being displayed in animation, the multimedia content is shown or played. Other information related to a person's personal life patterns can also be derived from the uploaded GPS log files and visualized for the user on a computer display or mobile phone. For example, the method 900 can derive common user routines or favorite routes and locations.

The method 900 can also show graphic summaries of activity levels per day, week, or month, etc., and can graph movement patterns and related statistics. The method 900 can also analyze and present statistics about a user's transportation modes in graphical form. In one implementation, the method 900 analyzes a person's personal patterns and makes suggestions based on pre-programming or based on comparison with norms derived from a public database of other users' optionally shared life patterns.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
   receiving, at a website, a location information file from a user;
   receiving multimedia content from the user;
   segmenting the location information file into user trips;
   inferring transportation mode of the user trips based at least in part on elapsed time between points in the location information file;
   associating the multimedia content with the user trips by tagging locations in the user trips to the multimedia content, wherein tagging locations in the user trips to the multimedia content enables a search for particular multimedia content to return a corresponding user trip; and
   displaying the user trips on a map, with indications of the inferred transportation mode and the associated multimedia content.

2. The method as recited in claim 1, further comprising:
   displaying an animation of one of the user trips on the displayed map;
   displaying an icon representing the user at a location on a user trip, the icon having an appearance representing a transportation mode used by the user at the location; and
   moving the icon along the user trip.

3. The method as recited in claim 2, further comprising displaying the multimedia content when the icon moves to a location on the user trip with which multimedia content is associated.

4. The method as recited in claim 1, further comprising receiving a search criterion from the user, wherein the search criterion retrieves user trips that meet the search criterion from a spatial-temporal index;
   wherein the user trips are listed as search results on the website.

5. The method as recited in claim 4, wherein the search criterion comprises one or both of:

a spatial search criterion created via the user selecting a geographic area on the map in order to retrieve search results comprising user trips within the selected geographic area; or
a temporal search criterion created via the user selecting a time interval in order to retrieve search results comprising user trips made within the selected time interval.

6. The method as recited in claim 1, further comprising recommending geographic routes and local features, wherein when a user in a given location requests a recommendation for a geographic route or a local feature, popular geographic routes and popular local features are retrieved from the public knowledge database and displayed to the user; and
   wherein a public knowledge database is mined for personal preferences of individual users.

7. The method as recited in claim 6, further comprising interfacing with mobile devices, wherein when a mobile device in a given location requests a recommendation for a geographic route or a local feature, popular geographic routes and popular local features are retrieved from the public knowledge database and displayed to the mobile device.

8. The method as recited in claim 1, further comprising displaying ancillary information calculated in relation to the user trip or from a public knowledge database to correspond with times and places along the user trips;
   wherein the ancillary information includes one of a weather report, a temperature, a distance of the user trip, a duration of the user trip, a start and an ending time of the user trip, a number of multimedia images and videos associated with the user trip, a number of segments of the user trip, modes of transportation used during the user trip, a latitude and longitude of a location on the user trip, an altitude of a location on the user trip, news associated with a time or a location of the user trip, various map views associated with locations along the user trip, or advertisements associated with locations along the user trip.

9. The method as recited in claim 2, further comprising:
   deriving statistics from a user's activity of the user indicated by the location information file;
   creating a visual depiction of the statistics; and
   displaying the visual depiction of the statistics to the user on the website or on a mobile device of the user.

10. The method as recited in claim 9, further comprising displaying statistics of the user's activities, including one of:
    an activity level for each day of the week;
    a ratio of transportation modes used over a time interval;
    a pattern of arrivals to or departures from a routine user location.

11. A system, comprising:
    a web user interface for uploading location information files of a user and multimedia contents to a service;
    a data processor to segment the location information files into geographic routes, to associate the multimedia contents to the geographic routes by tagging locations in the geographic routes to the multimedia contents, and to infer at least one transportation mode within a geographic route;
    an indexing engine to index the geographic routes, the indexing engine dividing the geographic routes into trips, the trips separated by a threshold duration of time, the indexing engine dividing the trips into segments, the segments distinguished based on a transportation mode of the user; and
    a visualization engine to display an animation of one of the indexed geographic routes on a map displayed on the web user interface, to display multimedia content associated with times and locations along the geographic routesand to display an icon representing the user at a location on the geographic routes, the icon having an appearance representing a transportation mode used by the user at the location.

12. The system as recited in claim 11, further comprising a route searching engine to receive a search criterion from the user, wherein the route searching engine uses the search criterion to retrieve geographic routes that meet the search criterion from a spatial-temporal index;
   wherein the geographic routes are listed as search results on the web user interface.

13. The system as recited in claim 11, further comprising:
   moving the icon along the geographic routes in forward and reverse directions along the geographic routes to allow a user to navigate the icon to select desired multimedia content; and
   displaying the multimedia content when the icon moves to a location on the geographic routes with which multimedia content is associated.

14. The system as recited in claim 11, further comprising a recommendation engine for requesting geographic routes and local features, wherein when a user in a given location requests a recommendation for a geographic route or a local feature, then popular geographic routes and popular local features are retrieved from a public knowledge database; and
   wherein the public knowledge database is mined from personal preferences of individual users derived from the location information files uploaded by the individual users.

15. The system as recited in claim 14, further comprising a mobile devices interface, wherein when a mobile device in a given location requests a recommendation for a geographic route or a local feature, popular geographic routes and popular local features are retrieved from the public knowledge database and displayed to the mobile device.

16. The system as recited in claim 11, wherein the visualization engine displays ancillary information corresponding to times and places along a geographic route; and
   wherein the ancillary information includes one of a weather report, a temperature, a distance of a user trip, a duration of the user trip, a start and an ending time of the user trip, a number of multimedia images and videos associated with the user trip, a number of segments of the user trip, modes of transportation used during the user trip, a latitude and longitude of a location on the user trip, an altitude of a location on the user trip, news associated with a time or a location of the user trip, various map views associated with locations along the geographic route, or advertisements associated with locations along the geographic route.

17. The system as recited in claim 11, wherein the visualization engine derives statistics from a user's activity indicated by the user's uploaded location information files, creates a visual depiction of the statistics, and displays the visual depiction of the statistics to the user on the website or an a mobile device of the user.

18. The system as recited in claim 17, wherein the visualization engine displays statistics of the user's activity, including one of:
   an activity level for each day of the week;
   a ratio of transportation modes used over a time interval; or
   a pattern of arrivals to or departures from a routine user location.

19. A system, comprising:
   means for segmenting a location information file received from a user into geographic routes, the segmenting including dividing the location information file into several trips if a time interval between two consecutive location points exceeds a time threshold;
   means for tagging multimedia contents received from the user with geographic locations from the location information file to associate the multimedia contents with the geographic routes; and
   means for displaying an animation of a user trip on a map, wherein the animation displays cues to the multimedia content at geographic locations on the map, the means for displaying including:
      means for displaying the geographic routes on the displayed map;
      means for displaying an icon having a location representing a location of the user at a location on the geographic routes and having an appearance representing a transportation mode used by the user at the location;
      means for moving the icon along the geographic routes in forward and reverse directions along the geographic routes to allow a user to navigate the icon to select desired multimedia content; and
      means for displaying the multimedia content, when the icon moves to a location on the geographic routes with which multimedia content is associated.

* * * * *